US012578697B2

(12) United States Patent
Itoh et al.

(10) Patent No.: US 12,578,697 B2
(45) Date of Patent: Mar. 17, 2026

(54) CONVEYOR SYSTEM

(71) Applicant: Itoh Denki Co., Ltd., Kasai (JP)

(72) Inventors: Kazuo Itoh, Kasai (JP); Tetsuya Itoh, Kasai (JP); Tomoya Matoba, Kasai (JP)

(73) Assignee: ITOH DENKI CO., LTD., Kasai (JP)

( * ) Notice: Subject to any disclaimer, the term of this patent is extended or adjusted under 35 U.S.C. 154(b) by 1003 days.

(21) Appl. No.: 17/068,758

(22) Filed: Oct. 12, 2020

(65) Prior Publication Data

US 2021/0124324 A1      Apr. 29, 2021

(30) Foreign Application Priority Data

Oct. 25, 2019    (JP) ................................. 2019-194676

(51) Int. Cl.
G05B 19/042        (2006.01)
B65G 23/36        (2006.01)
(Continued)

(52) U.S. Cl.
CPC ........... G05B 19/042 (2013.01); B65G 23/36 (2013.01); B65G 43/00 (2013.01); B65G 47/34 (2013.01);
(Continued)

(58) Field of Classification Search
CPC .......... G05B 19/042; G05B 2219/2621; G05B 2219/34491; G05B 2219/37285;
(Continued)

(56) References Cited

U.S. PATENT DOCUMENTS 5,293,322 A * 3/1994 Yagi ................... G05B 19/4063
                                                    700/218
5,460,257 A    10/1995 Yoshida
(Continued)

FOREIGN PATENT DOCUMENTS

AU            634261 B2     2/1993
DE      102010037601 A1     4/2011
(Continued)

OTHER PUBLICATIONS

EP Search Report of Nov. 29, 2022 in EP Pat App No 20782192.7 which is EP counterpart of possibly related U.S. Appl. No. 17/492,703, filed Oct. 4, 2021, which has overlapping inventorship/ownership with the present application. Submitted additionally for Frn Pat Doc Cite No. 1.
(Continued)

*Primary Examiner* — Michael Collins
(74) *Attorney, Agent, or Firm* — Kratz, Quintos & Hanson, LLP

(57)        ABSTRACT
Conveyor system may comprise conveyor mechanism(s) provided with transport path(s) along which conveyed object(s) are conveyed to transport destination(s); electric current detector(s) and/or abnormality detector(s) that detect triggering event(s) which may be event(s) occurring at conveyor mechanism(s) due to conveyed object(s) during transport of conveyed object(s); and removal processor(s) that, when triggering event(s) detected by electric current detector(s) and/or abnormality detector(s) satisfy triggering condition(s), cause conveyed object(s) to be transported by conveyor mechanism(s) to removal area(s) which are not transport destination(s).

18 Claims, 16 Drawing Sheets

(51) Int. Cl.
| | |
|---|---|
| *B65G 37/00* | (2006.01) |
| *B65G 43/00* | (2006.01) |
| *B65G 47/34* | (2006.01) |

(52) U.S. Cl.
CPC .... *B65G 37/005* (2013.01); *B65G 2203/0266* (2013.01); *G05B 2219/2621* (2013.01)

(58) Field of Classification Search
CPC ........... G05B 2219/37632; G05B 2219/45054; G05B 19/4189; G05B 19/0428; B65G 43/00; B65G 37/005; B65G 47/34; B65G 2203/0266; B65G 23/36; B65G 47/54; B65G 43/08; Y02P 90/02
See application file for complete search history.

(56) References Cited

U.S. PATENT DOCUMENTS

| | | | |
|---|---|---|---|
| 6,021,888 | A | 2/2000 | Itoh et al. |
| 6,705,526 | B1 | 3/2004 | Zhu |
| 6,820,736 | B2 | 11/2004 | Itoh et al. |
| 6,827,202 | B2 | 12/2004 | Topmiller |
| 6,843,362 | B2 | 1/2005 | Tachibana et al. |
| 6,873,882 | B2 | 3/2005 | Tachibana et al. |
| 7,026,732 | B1 | 4/2006 | Backman |
| 7,542,823 | B2 | 6/2009 | Nagai |
| 7,591,365 | B2 | 9/2009 | Knepple |
| 7,996,104 | B2 | 8/2011 | Wielebski |
| 8,042,681 | B2 | 10/2011 | Chuang |
| 8,186,499 | B2 | 5/2012 | Brandt |
| 8,396,587 | B2 * | 3/2013 | Saitou ................ G05B 19/4189 |
| | | | 713/400 |
| 8,499,920 | B2 | 8/2013 | Ogawa |
| 8,550,234 | B2 | 10/2013 | Breen |
| 8,757,363 | B2 | 6/2014 | Combs |
| 8,763,788 | B2 | 7/2014 | Neiser |
| 8,887,897 | B2 | 11/2014 | Itoh et al. |
| 9,037,290 | B2 | 5/2015 | Neiser |
| 9,221,617 | B2 * | 12/2015 | Waller ................... B65G 23/44 |
| 9,446,907 | B2 | 9/2016 | Tachibana et al. |
| 9,446,908 | B2 | 9/2016 | Danelski |
| 9,555,978 | B1 * | 1/2017 | Hanssen .............. B65G 1/1378 |
| 9,617,083 | B2 | 4/2017 | Itoh et al. |
| 2003/0115408 | A1 | 6/2003 | Topmiller et al. |
| 2003/0116408 | A1 * | 6/2003 | Topmiller ........... B65G 47/261 |
| | | | 198/781.05 |
| 2003/0135299 | A1 | 7/2003 | Tachibana et al. |
| 2003/0168316 | A1 * | 9/2003 | Knepple ................ B65G 47/30 |
| | | | 198/460.1 |
| 2003/0209410 | A1 | 11/2003 | Itoh et al. |
| 2004/0003982 | A1 | 1/2004 | Tachibana et al. |
| 2004/0166911 | A1 | 8/2004 | Chen |
| 2004/0182684 | A1 | 9/2004 | Guidetti |
| 2005/0262363 | A1 | 11/2005 | Claseman |
| 2009/0099686 | A1 | 4/2009 | Yoshikawa et al. |
| 2010/0058098 | A1 * | 3/2010 | Saitou ................ G05B 19/4189 |
| | | | 713/400 |
| 2012/0004766 | A1 | 1/2012 | Stoll et al. |
| 2012/0048682 | A1 * | 3/2012 | Itoh ........................ B65G 13/02 |
| | | | 198/780 |
| 2012/0323358 | A1 * | 12/2012 | Izumi ..................... G06V 10/26 |
| | | | 901/50 |
| 2014/0305227 | A1 | 10/2014 | Johns |
| 2014/0330430 | A1 * | 11/2014 | Waller ................... B65G 43/00 |
| | | | 700/230 |
| 2015/0068871 | A1 * | 3/2015 | Tachibana .............. B65G 43/10 |
| | | | 198/502.1 |
| 2015/0210484 | A1 * | 7/2015 | Itoh ........................ B65G 47/54 |
| | | | 198/370.01 |
| 2017/0101273 | A1 | 4/2017 | Itoh et al. |
| 2018/0327191 | A1 * | 11/2018 | Nagatani ............ G05B 19/4189 |
| 2020/0299068 | A1 * | 9/2020 | Hampe .................. B65G 13/02 |
| 2022/0024697 | A1 * | 1/2022 | Itoh .................... G05B 19/4189 |

FOREIGN PATENT DOCUMENTS

| | | | |
|---|---|---|---|
| EP | 2159655 | A2 | 3/2010 |
| EP | 2829496 | A1 | 1/2015 |
| JP | S55-101505 | A | 8/1980 |
| JP | 1986-229753 | A | 10/1986 |
| JP | H2-193808 | A | 7/1990 |
| JP | H5-77915 | A | 3/1993 |
| JP | H6-293426 | A | 10/1994 |
| JP | 1995-041139 | A | 2/1995 |
| JP | H7-285661 | A | 10/1995 |
| JP | 2001-240231 | A | 9/2001 |
| JP | 2002-012315 | A | 1/2002 |
| JP | 2002-370828 | A | 12/2002 |
| JP | 2005-231745 | A | 9/2005 |
| JP | 2006-312514 | A | 11/2006 |
| JP | 2007-317079 | A | 12/2007 |
| JP | 2007-326654 | A | 12/2007 |
| JP | 2009-115606 | A | 5/2009 |
| JP | 2012-211015 | A | 11/2012 |
| JP | 2013-199359 | A | 10/2013 |
| JP | 2013-230914 | A | 11/2013 |
| JP | 6142231 | B2 | 6/2017 |
| WO | 2013141066 | A1 | 9/2013 |
| WO | 2014050821 | A1 | 4/2014 |
| WO | 2014050822 | A1 | 4/2014 |

OTHER PUBLICATIONS

Applicant brings to the attention of the Examiner the existence of U.S. Appl. No. 17/492,703, filed Oct. 4, 2021, which is a bypass CIP of International Application No. PCT/JP2020/013075 filed on Mar. 24, 2020 and published as WO 2020 203477 A1 on Oct. 8, 2020 and which has overlapping inventorship and/or ownership as in the present case.

Applicant brings to the attention of the Examiner the existence of U.S. Appl. No. 15/312,243, which is the national stage of International Application No. PCT/JP2015/082163 filed on Nov. 16, 2015 and published as WO 2016 080362 A1 on May 26, 2016 and as US 2017010273 A1 on Apr. 13, 2017, and which has overlapping Inventorship and/or ownership as in the present case. Also see US Pat App Pub Cite No. 1.

Applicant brings to the attention of the Examiner the existence of U.S. Appl. No. 14/386,180, filed Mar. 11, 2013, published as US 2015 068871 A1 on Mar. 12, 2015, and issued as U.S. Pat. No. 9,446,907 B2 on Sep. 20, 2016, which was the national stage of PCT/JP2013/056692 filed on Mar. 11, 2013 and published as WO 2013 141066 A1 on Sep. 26, 2013, and which has overlapping inventorship/ownership with the present case.

Applicant brings to the attention of the Examiner the existence of U.S. Appl. No. 09/050,785, filed Mar. 30, 1998 and issued as U.S. Pat. No. 6,021,888 A on Feb. 8, 2000, which has overlapping inventorship/ownership with the present case.

Applicant brings to the attention of the Examiner the existence of U.S. Appl. No. 10/312,186, filed Jun. 25, 2002, published as US 2004 0003982 A1 on Jan. 8, 2004, and issued as U.S. Pat. No. 6,843,362 B2 on Jan. 18, 2005, which was the national stage of PCT/JP2002/06372 filed on Jun. 25, 2002 and published as WO 2003 002436 A1 on Jan. 9, 2003, and which has overlapping inventorship/ownership with the present case.

Applicant brings to the attention of the Examiner the existence of U.S. Appl. No. 10/296,755, filed Jun. 14, 2002, published as US 2003 0135299 A1 on Jul. 17, 2003, and issued as U.S. Pat. No. 6,873,882 B2 on Mar. 29, 2005, which was the national stage of PCT/JP2002/05989 filed on Jun. 14, 2002 and published as WO 2003 000574 A1 on Jan. 3, 2003, and which has overlapping inventorship/ownership with the present case.

Applicant brings to the attention of the Examiner the existence of U.S. Appl. No. 10/425,521, filed Apr. 29, 2003, published as US 2003 0209410 A1 on Nov. 13, 2003, and issued as U.S. Pat. No. 6,820,736 B2 on Nov. 23, 2004, and which has overlapping inventorship/ownership with the present case.

Applicant brings to the attention of the Examiner the existence of U.S. Appl. No. 14/565,466, filed Dec. 10, 2014, published as US

(56)        References Cited

OTHER PUBLICATIONS 2015 210484 A1 on Jul. 30, 2015, and issued as U.S. Pat. No.
9,617,083 B2 on Apr. 11, 2017, and which has overlapping inventorship/
ownership with the present case.
Applicant brings to the attention of the Examiner the existence of
U.S. Appl. No. 13/181,675, filed Jul. 13, 2011, published as US
2012 048682 A1 on Mar. 1, 2012, and issued as U.S. Pat. No.
8,887,897 B2 on Nov. 18, 2014, and which has overlapping inventorship/
ownership with the present case.
EP Search Report of Dec. 9, 2015 in EP Pat App No 13764466.2
which is counterpart of US Pat App Pub Cite No 1, US Pat Cite No
1, and Frn Pat Doc Cite Nos. 1-3. Also see NPL Cite No 1.

* cited by examiner

| Jam Errors | |
|---|---|
| Location (zone) where abnormality occurred | Identifier information ID |
| Z2 | 9 |
| Z5 | 3 |
| Z5 | 5 |
| Z5 | 9 |
| Z7 | 9 |
| Z8 | 7 |
| Z10 | 2 |
| Z14 | 3 |
| Z22 | 8 |

FIG. 7

| Zone (address) | Identifier information ID | Rotational velocity Vr (rpm) | Motor current Im (A) |
|---|---|---|---|
| Z1 | 1 | 1400 | 1.0 |
| Z1 | 2 | 1400 | 1.1 |
| Z1 | 3 | 1400 | 1.2 |
| Z2 | 1 | 2200 | 1.6 |
| Z2 | 2 | 1400 | 1.2 |
| Z2 | 3 | 2200 | 1.5 |
| Z3 | 1 | 2200 | 1.4 |
| Z3 | 2 | 3000 | 1.7 |
| Z3 | 3 | 3000 | 1.8 |
| Z4 | 1 | 2200 | 1.8 |
| Z4 | 2 | 1400 | 0.8 |
| Z4 | 3 | 2200 | 1.6 |
| Z5 | 1 | 2200 | 1.4 |
| Z5 | 2 | 2200 | 1.6 |
| Z5 | 3 | 3000 | 4.2 |
| Z6 | 1 | 1400 | 0.3 |
| Z6 | 2 | 2200 | 0.7 |
| Z6 | 3 | 2200 | 0.5 |
| Z7 | 1 | 2200 | ———— |
| Z7 | 2 | 2200 | ———— |
| Z7 | 3 | 2200 | 1.5 |
| . . . | . . . | . . . | . . . |

FIG. 8

| Rotational velocity (rpm) | First electric current value I1 (A) | Second electric current value I2 (A) |
|---|---|---|
| 1400 | 1.3 | 0.9 |
| 2200 | 1.7 | 1.3 |
| 3000 | 2.0 | 1.6 |

| Jam errors | |
|---|---|
| Identifier information ID | First abnormality count CT1 |
| 2 | 1 |
| 3 | 2 |
| 5 | 1 |
| 7 | 1 |
| 8 | 1 |
| 9 | 3 |

FIG. 16

| Jam errors | |
|---|---|
| Location (zone) where abnormality occurred | Second abnormality count CT2 |
| Z2 | 1 |
| Z5 | 3 |
| Z7 | 1 |
| Z8 | 1 |
| Z10 | 1 |
| Z14 | 1 |
| Z22 | 1 |

FIG. 17

CONVEYOR SYSTEM

PRIORITY CLAIM AND INCORPORATION BY REFERENCE

This application claims benefit of priority under 35 USC 119(a)-(d) to Japanese Patent Application No 2019-194676, entitled "Conveyor System", filed 25 Oct. 2019, the content of which is incorporated herein in its entirety by reference.

FIELD OF THE INVENTION

The present invention relates to a conveyor system that conveys conveyed objects.

BACKGROUND

A belt conveyor may be such that the time required for a conveyed object to traverse a prescribed spatial interval within a transport path is monitored, determination being made that the conveyed object is stuck, i.e., that a jam has occurred, when that time exceeds a standard time.

During occurrence of a jam or other such event within the transport path of such a conveyor, it may be the case that the cause of that event lies with the conveyed object.

There is therefore a need for a conveyor system capable of removing a conveyed object that, were it not removed, would cause occurrence of a prescribed event within the transport path of a conveyor.

SUMMARY OF INVENTION

A conveyor system in accordance with one aspect of the present invention comprises a conveyor mechanism provided with a transport path along which a conveyed object is conveyed to a prescribed transport destination; an event detector that detects a triggering event which is an event occurring at the conveyor mechanism due to the conveyed object during transport of the conveyed object; and a removal processor that, when the triggering event detected by the event detector satisfies a triggering condition, causes the conveyed object to be transported by the conveyor mechanism to a removal area which is not the transport destination.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 7 is an explanatory diagram showing exemplary error information that might be stored at an abnormality history storage unit.

FIG. 8 is an explanatory diagram showing exemplary electric current information that might be stored at a motor electric current storage unit.

FIG. 16 is an explanatory diagram showing exemplary first abnormality count that might be stored at an abnormality history storage unit by a first abnormality counter.

FIG. 17 is an explanatory diagram showing exemplary second abnormality count that might be stored at an abnormality history storage unit by a second abnormality counter.

EMBODIMENTS FOR CARRYING OUT INVENTION

Figure 1:
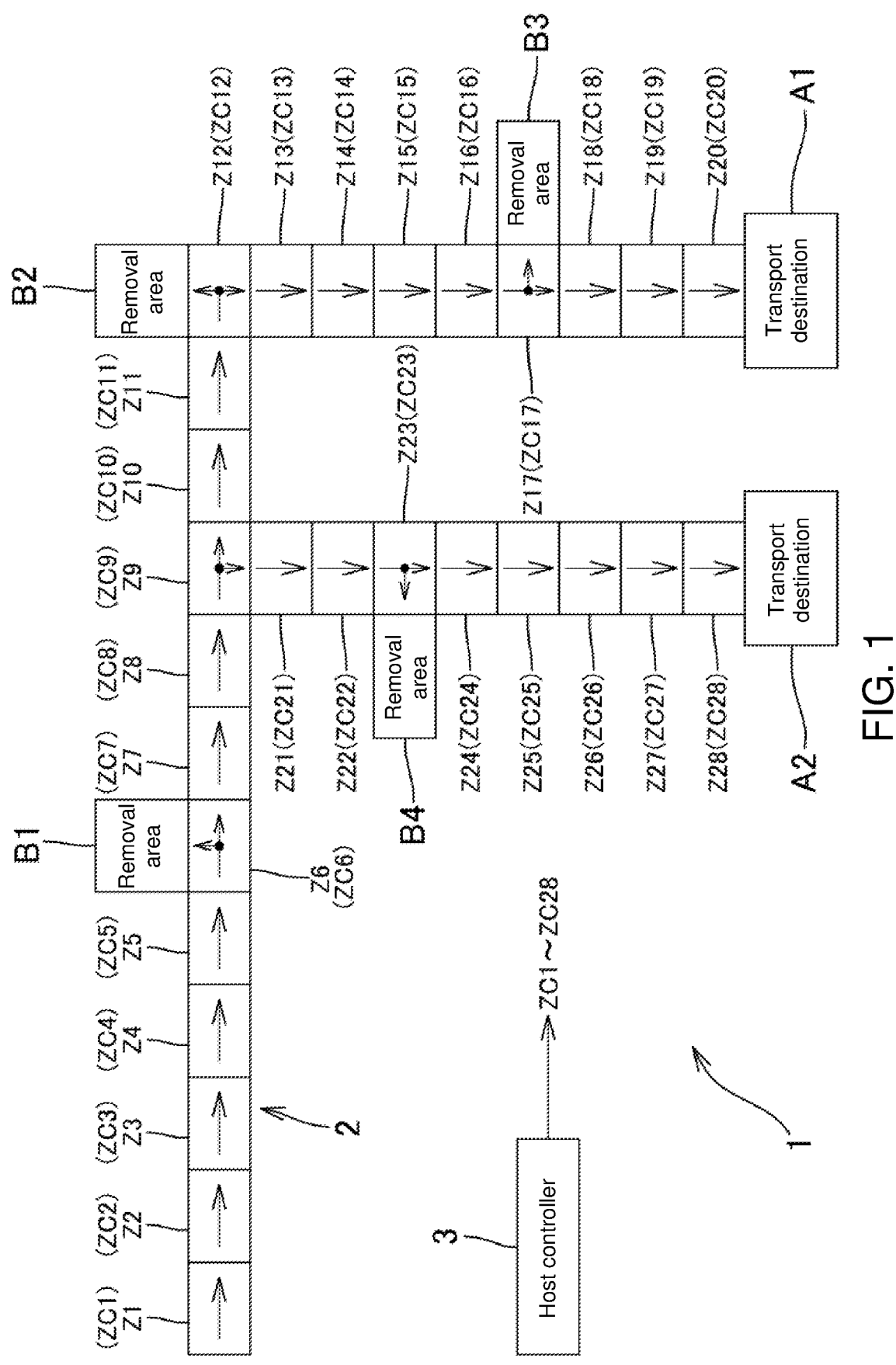
FIG. 1 is a block diagram showing exemplary constitution of a conveyor system associated with an embodiment of the present invention.

Below, embodiments in accordance with one aspect of the present invention are described with reference to the drawings. Note that like constituents are assigned like reference numerals throughout the drawings and that repetitive description thereof is omitted.

FIG. 1 is a block diagram showing exemplary constitution of a conveyor system associated with an embodiment of the present invention. Conveyor system 1 shown in FIG. 1 is provided with conveyor device 2 and host controller 3.

Conveyor device 2 is such that the transport route thereof is divided into a plurality of zones Z1 through Z28. It is an object of conveyor device 2 of the present example to convey conveyed objects that are of roughly uniform size, such as pallets, containers, and trays. Zones Z1 through Z28 will in most cases each be of a length which is sufficient to allow placement therewithin of at least one conveyed object. In some cases, length of the transport route might be 1 km or more. As described below, note that the transport route of conveyor device 2 may be loop-like.

At the example shown in FIG. 1, conveyor device 2 of the present embodiment is capable of causing a conveyed object to be conveyed to two transport destinations A1, A2. Furthermore, conveyor device 2 of the present embodiment is capable of causing a conveyed object to be removed therefrom at four removal areas B1 through B4. Note that in other embodiments there may be one transport destination, or there may be three or more thereof. Furthermore, note that in other embodiments there may be three or fewer removal areas, or there may be five or more thereof.

Below, zones Z1 through Z28 are collectively referred to as zones Z, transport destinations A1, A2 are collectively referred to as transport destinations A, and removal areas B1 through B4 are collectively referred to as removal areas B.

Included among the types of respective zones Z are forward zone(s) in which a conveyed object is made to move forward, and direction changing zone(s) in which a conveyed object is capable of being conveyed in a direction that intersects the forward direction. Direction changing zones include branched zones capable of causing the transport direction to be branched such that selection is possible between forward and direction change.

At FIG. 1, the types of the respective zones are indicated by arrows. Forward arrows indicate forward zones. Arrows that change direction indicate direction changing zones, and arrows that are branched indicate those direction changing zones which are branched zones. Note that these are merely examples of types of zones Z, it being possible in other embodiments for other types of zones to be included thereamong.

Note that the arrangement of respective zones Z shown in FIG. 1 has been employed for convenience of description and should not be understood to necessarily indicate an arrangement of zones Z that would be suitable for practical use.

Each of zones Z1 through Z28 is respectively constituted from one of conveyor modules M1 through M28. Below, conveyor modules M1 through M28 are collectively referred to as conveyor modules M. Included among the types of conveyor modules M are forward conveying module(s) Ms constituting forward zone(s), and direction changing module(s) Mt constituting direction changing zone(s).

Conveyor modules M1 through M28 are provided with conveyor mechanisms MC, described below; and local controllers ZC1 through ZC28 which control operation of conveyor mechanisms MC. That is, each of zones Z1 through Z28 is respectively provided with a corresponding local controller ZC1 through ZC28.

Local controllers ZC1 through ZC28 are collectively referred to as local controllers ZC. Furthermore, notwithstanding that reference may be made simply to zones Z, this should be understood to include by extension the local controllers ZC and conveyor modules M that constitute the respective zones Z.

Transmission and reception of data is made possible between local controllers ZC1 through ZC28 and host controller 3, and mutually among local controllers ZC1 through ZC28, by way of communication cable(s), not shown, through which these are interconnected. Communication between respective local controllers ZC and host controller 3, and mutually among local controllers ZC1 through ZC28, may be made possible, for example, via Ethernet (registered trademark) or other such communication protocol, and/or communication therebetween may be made possible in wireless fashion rather than by way of communication cable(s), there being no limitation with respect to such communication protocol.

Figure 2:
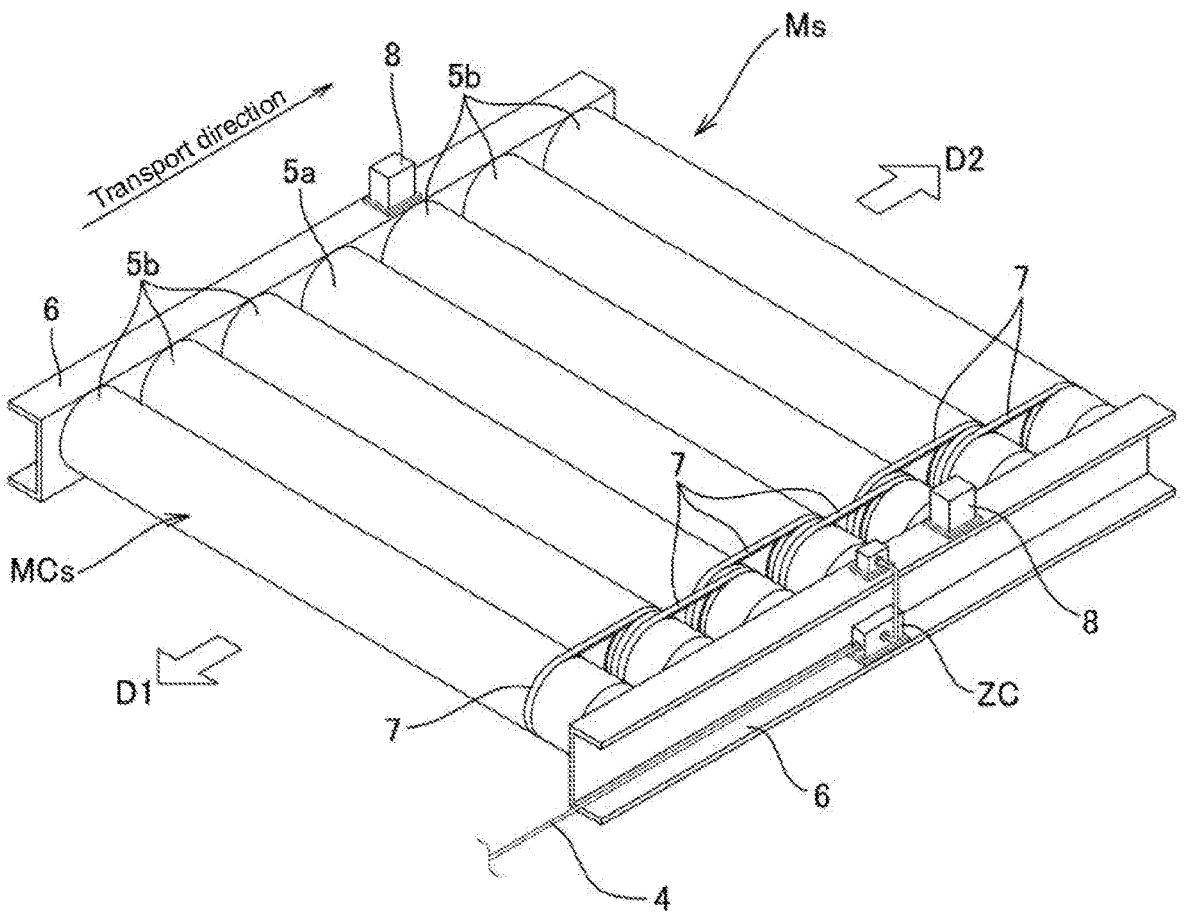
FIG. 2 is a perspective view showing exemplary constitution of a forward conveying module constituting a forward zone.

FIG. 2 is a perspective view showing the exemplary constitution of a forward conveying module Ms constituting a forward zone. Forward conveying module Ms shown in FIG. 2 is what is referred to as a roller conveyor. Forward conveying module Ms is provided with conveyor mechanism MCs, local controller ZC, and inventory sensor 8. Conveyor mechanism MCs is provided with drive roller 5a which has an internal motor; a plurality of idler rollers 5b which are made to rotate in idler fashion by drive roller 5a; a pair of sideframes 6, 6 providing means at prescribed pitch about which drive roller 5a and idler rollers 5b can rotate; and belt 7. Below, drive roller 5a and idler rollers 5b are collectively referred to as transport rollers 5.

Adjacent transport rollers 5 within forward conveying module Ms are mutually wrapped about by belt 7. As a result, the rotary drive force from the motor which is internal to drive roller 5a is transmitted by way of belt 7 to the other rollers, i.e., idler rollers 5b, such that the respective idler rollers 5b are made to rotate in idler fashion by drive roller 5a. That is, belt 7 is driven by the motor. The transport route for the conveyed object is formed by the top surfaces of transport rollers 5.

Drive roller 5a carries out rotary driving in correspondence to control signals sent thereto from local controller ZC. As a result, it is possible for local controller ZC to control transport of the conveyed object at forward conveying module Ms, i.e., at zone Z.

Note that forward conveying module Ms shown in FIG. 2 is merely exemplary, it being possible for the number of transport roller(s) 5 at each of zones Z to be increased or decreased as desired. Furthermore, whereas an example has been shown in which zone Z is a roller conveyor, zone Z may be constituted from a conveyor mechanism other than a roller conveyor, such as one that employs a belt conveyor or the like.

Inventory sensor 8 might, for example, be installed above sideframes 6, 6 at locations near the downstream ends thereof. Inventory sensor 8 might, for example, be a transmission-type photoelectric sensor, the light-emitting component of which is arranged on one of sideframes 6, 6 and the light-receiving component of which is arranged on the other, the pair made up of the light-emitting component and the light-receiving component functioning as a single sensor. Inventory sensor 8 detects whether a conveyed object is present at the transport path of forward conveying module Ms, and causes that detection signal to be output to local controller ZC.

In the description which follows, inventory sensor 8 is said to be ON when a conveyed object is detected, and is said to be OFF when a conveyed object is not detected. Note that the ON/OFF logic may be reversed.

Figure 3:
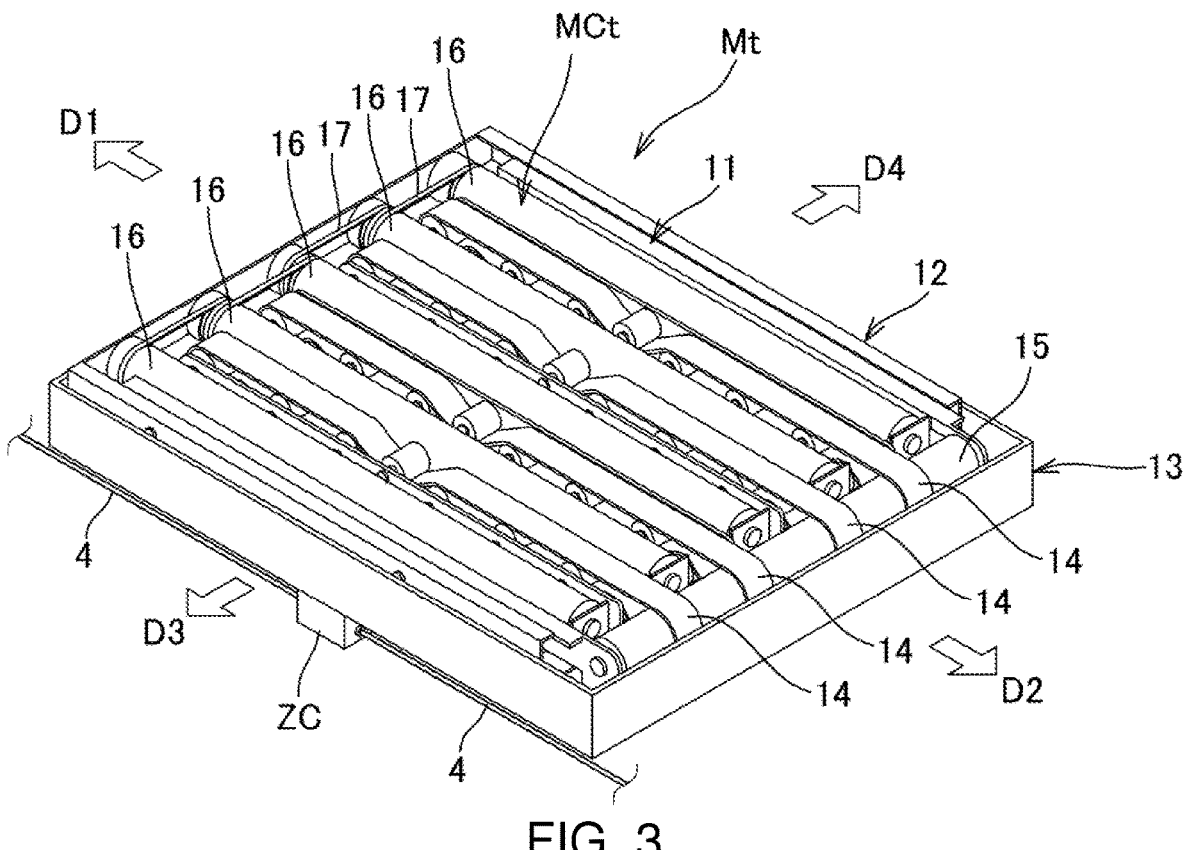
FIG. 3 is a perspective view showing exemplary constitution of a direction changing module constituting a direction changing zone that includes a branched zone.
Figure 4:
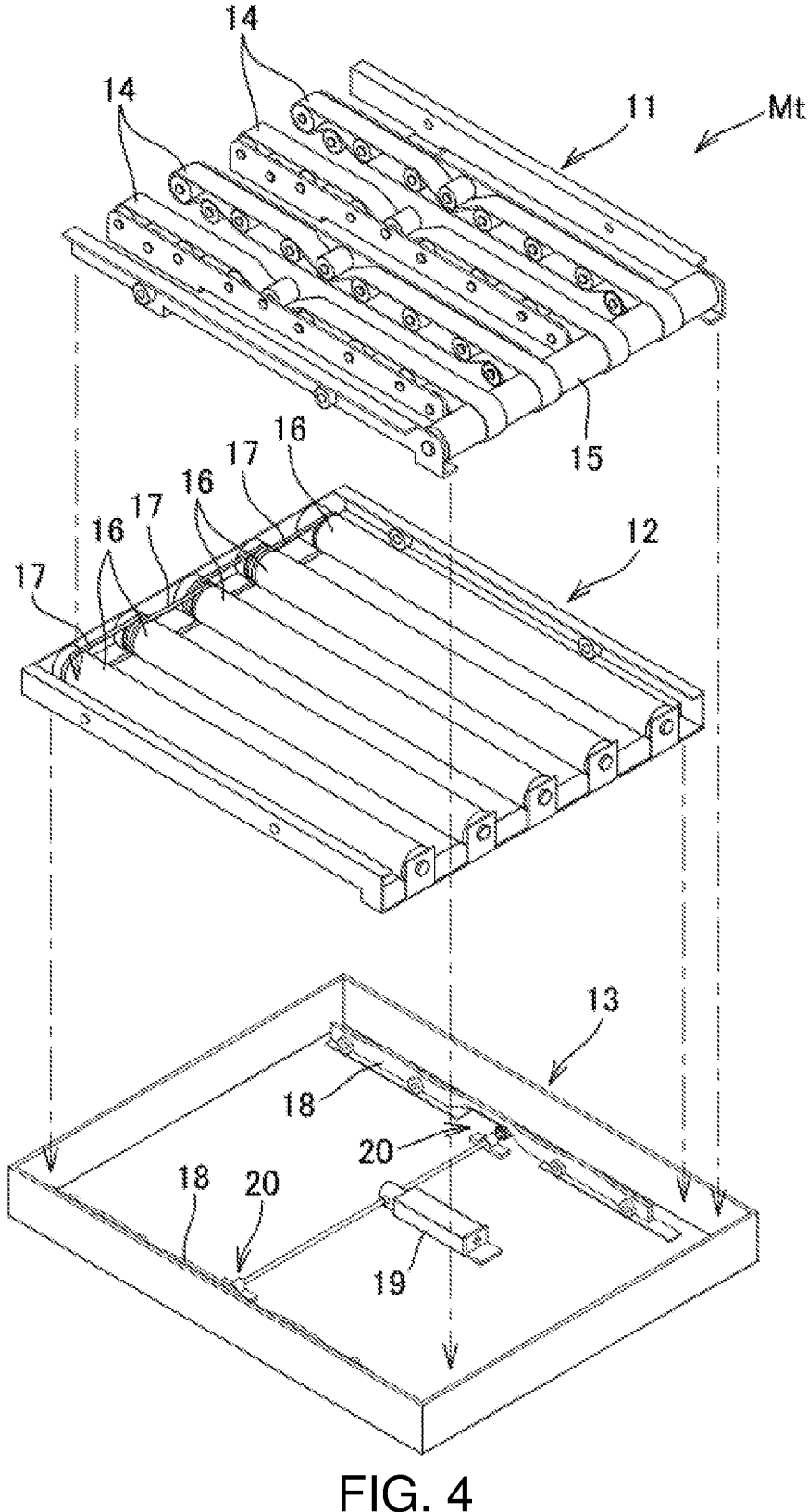
FIG. 4 is an exploded perspective view of the direction changing module shown in FIG. 3.

FIG. 3 is a perspective view showing the exemplary constitution of a direction changing module Mt constituting a direction changing zone that includes a branched zone. FIG. 4 is an exploded perspective view of the direction changing module Mt shown in FIG. 3. Direction changing module Mt shown in FIG. 3 is capable of causing the transport direction of a conveyed object to be changed by switching incoming and outgoing directions.

Direction changing module Mt is provided with conveyor mechanism MCt capable of changing direction; local controller ZC; elevator controller 21, described below; and inventory sensor 8, not shown. Conveyor mechanism MCt is constituted from main transport conveyor 11, subordinate transport conveyor 12, and elevator device 13 shown in FIG. 4. Conveyor mechanisms MCs and conveyor mechanisms MCt are collectively referred to as conveyor mechanisms MC.

Main transport conveyor 11 is provided with a plurality of belts 14, and a drive roller 15 from which the plurality of belts 14 are suspended as a result of being wrapped thereabout. Drive roller 15 has an internal motor and carries out rotary driving in correspondence to control signals sent thereto from local controller ZC. That is, belts 14 are driven by the motor. The top surfaces of the plurality of belts 14 serves as the transport route at main transport conveyor 11. The transport direction of main transport conveyor 11 is the same as the transport direction of conveyor device 2.

Subordinate transport conveyor 12 is what is referred to as a roller conveyor. Subordinate transport conveyor 12 is provided with a plurality of rollers 16, and a belt 17 that causes these rollers 16 to rotate in linked fashion. One among the plurality of rollers 16 might, for example, be a drive roller that has an internal motor. That is, belt 17 would be driven by a motor. The drive roller would carry out rotary driving in correspondence to control signals sent thereto from local controller ZC.

Respective rollers 16 are arranged such that each is located between a pair of belts 14 of main transport conveyor 11. The top surfaces of respective rollers 16 serve as the transport path at subordinate transport conveyor 12. The transport direction of subordinate transport conveyor 12 is perpendicular to the transport direction of main transport conveyor 11, which is to say that it is perpendicular to the transport direction of conveyor device 2.

Elevator device 13 is provided with a pair of direct-acting cams 18, elevator motor 19 which carries out rotary driving in correspondence to control signals sent thereto from elevator controller 21, and rack-and-pinion mechanism 20 which causes the pair of direct-acting cams 18 to move in sliding fashion as a result of the drive force from elevator motor 19. Main transport conveyor 11 and subordinate transport conveyor 12 are raised and lowered in correspondence to the slide position of direct-acting cams 18.

By driving rack-and-pinion mechanism 20 and changing the location of direct-acting cams 18, elevator motor 19 is capable of carrying out switching between a forward orientation in which main transport conveyor 11 protrudes above subordinate transport conveyor 12, and a direct changing orientation in which subordinate transport conveyor 12 protrudes above main transport conveyor 11.

By causing main transport conveyor 11 to be driven while direction changing module Mt is in its forward orientation as a result of its orientation having been changed by elevator controller 21, local controller ZC is able to cause the conveyed object to move forward. Furthermore, by causing subordinate transport conveyor 12 to be driven while direction changing module Mt is in its direction changing orientation as a result of its orientation having been changed by elevator controller 21, local controller ZC is able to cause the conveyed object to be conveyed in a direction that intersects the forward direction. As a result, direction changing module Mt is capable of switching the transport direction of the conveyed object.

Note that it is sufficient that direction changing module Mt be capable of switching the transport direction of the conveyed object, there being no limitation that this necessarily be carried out as a result of elevator control of main transport conveyor 11 and subordinate transport conveyor 12, which is merely one example of how switching of transport direction might be accomplished.

Below, as shown in FIG. 2 and FIG. 3, at the respective conveyor modules M, the direction that is upstream in the transport direction is indicated by reference numeral D1, the direction that is downstream in the transport direction is indicated by reference numeral D2, the direction that is toward the right of the transport direction is indicated by reference numeral D3, and the direction that is toward the left of the transport direction is indicated by reference numeral D4.

Figure 5:
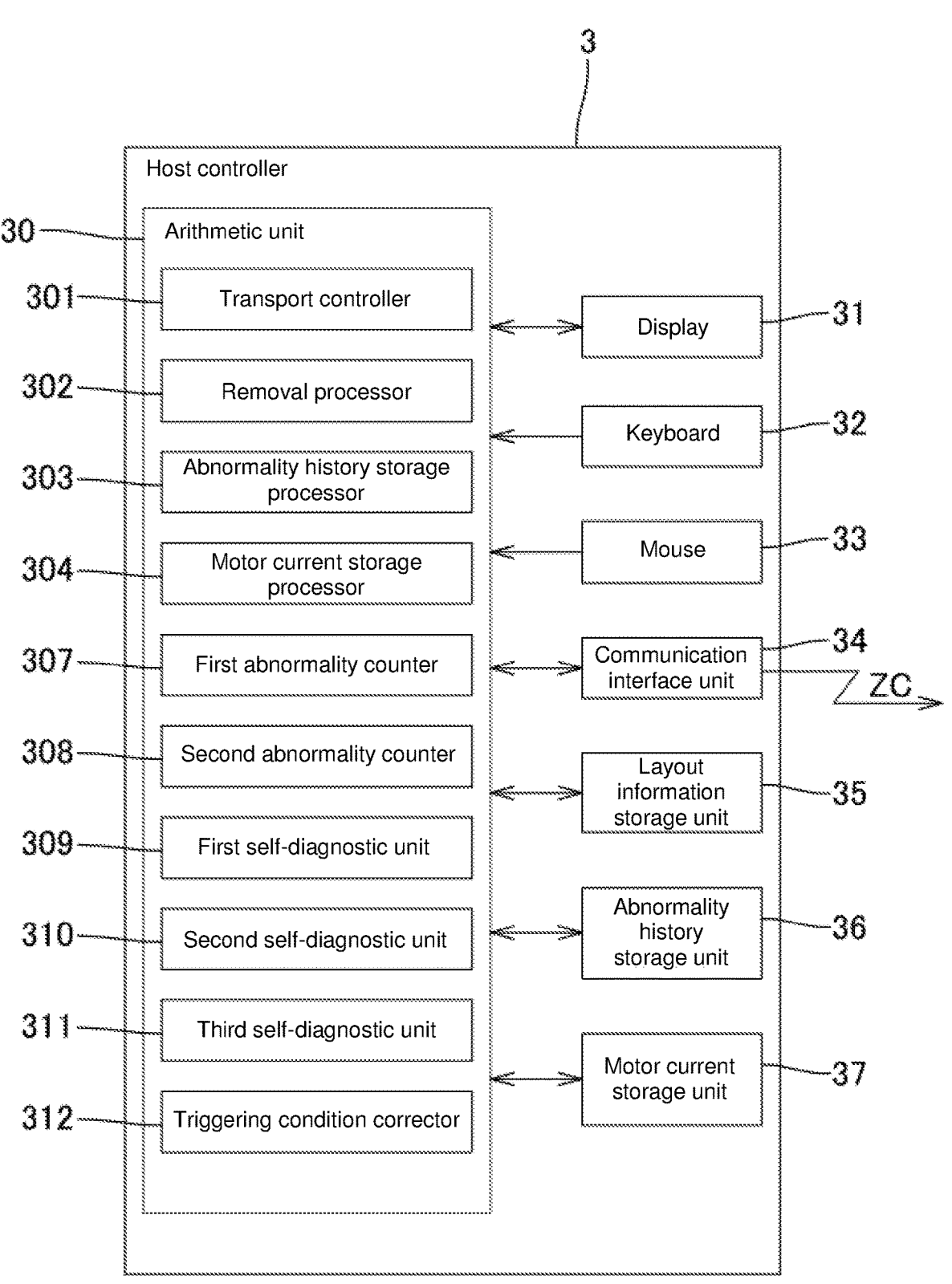
FIG. 5 is a block diagram showing exemplary constitution of the host controller shown in FIG. 1.

FIG. 5 is block diagram showing an exemplary constitution of the host controller 3 shown in FIG. 1. Host controller 3 shown in FIG. 5 is provided with arithmetic unit 30, display 31, keyboard 32, mouse 33, communication interface unit 34, layout information storage unit 35, abnormality history storage unit 36, and motor current storage unit 37.

Host controller 3 might, for example, be constituted as a result of employment of a personal computer, programmable controller (PLC), or other such information processing device. Display 31 might, for example, be a display device employing a liquid crystal display device, an organic EL (electroluminescent) panel, or the like.

Communication interface unit 34 might, for example, be an Ethernet (registered trademark) or other such communication interface circuit. As described above, communication interface unit 34 is constituted so as to permit transmission and reception of data with the respective local controllers ZC.

Arrangement information indicating the arrangement of the respective zones Z is stored in advance at layout information storage unit 35. Furthermore, stored in advance at layout information storage unit 35 in association with respective zones Z are addresses (communication addresses) assigned to respective zones Z, zone type information for respective zones Z, and motor information.

For example in the case of conveyor device 2 shown in FIG. 1, arrangement information would indicate that zones Z1 through Z12 are connected in series, that zones Z13 through Z20 are connected to zone Z12 in direction D3 (toward the right of the transport direction), and that zones Z21 through Z28 are connected to zone Z9 in direction D3. Furthermore, arrangement information would indicate that transport destination A1 is arranged in direction D2 (downstream in the transport direction) from zone Z20, and that transport destination A2 is arranged in direction D2 from zone Z28.

Furthermore, arrangement information would indicate that removal areas B1, B2, and B3 are arranged in direction D4 (toward the left of the transport direction) from zones Z6, Z12, and Z17; and that removal area B4 is arranged in direction D3 from zone Z23.

Assigned to the local communication unit 57 (described below) of each local controller ZC is an address for its identification. The address assigned to local communication unit 57 is also the address of the zone Z and the local controller ZC that are provided with that local communication unit 57. That is, an address is an example of information that indicates its zone. Addresses of respective zones Z are stored in advance at layout information storage unit 35.

At the example shown in FIG. 1, the characters next to the reference numerals for the respective zones Z indicate the addresses thereof. For example, the address of zone Z1 is 1, and the address of zone Z9 is 9.

Zone type information is information indicating types of respective zones Z. Types of respective zones Z include forward zones, direction changing zones, and so forth. At the example shown in FIG. 1, zones Z1 through Z5, Z7 through Z11, Z13 through Z16, Z18 through Z20, Z21, Z22, and Z24 through Z28 are forward zones; and zones Z6, Z12, Z17, and Z23 are direction changing zones.

Arithmetic unit 30 might, for example, be constituted by employment of a CPU (central processing unit) that executes prescribed arithmetic operations; RAM (random access memory) that stores data temporarily; HDD (hard disk drive, SSD (solid state drive), or other such nonvolatile storage device; a timer circuit, circuits peripheral with respect thereto, and/or the like.

The aforementioned storage device may also be employed as layout information storage unit 35, abnormality history storage unit 36, and motor current storage unit 37. By executing programs stored in the aforementioned storage device, arithmetic unit 30 functions as transport controller 301, removal processor 302, abnormality history storage processor 303, motor current storage processor 304, first abnormality counter 307, second abnormality counter 308, first self-diagnostic unit 309, second self-diagnostic unit 310, third self-diagnostic unit 311, and triggering condition corrector 312.

By sending instructions, data, and so forth to respective local controllers ZC by way of communication interface unit 34, and receiving data and so forth by way of communication interface unit 34 from respective local controllers ZC, transport controller 301 controls the operation of conveyor device 2. Below, communication by arithmetic unit 30 (transport controller 301, etc.) with zones Z by way of communication interface unit 34 is referred to simply as communication, acquisition, access, and so forth by arithmetic unit 30 (transport controller 301, etc.).

Furthermore, requests by arithmetic unit 30 (transport controller 301, etc.) with respect to local controllers ZC of respective zones Z, and acquisition of information and so forth pertaining to respective zones Z that has been caused to be sent from local controllers ZC, is referred to simply as acquisition thereof from respective zones Z by arithmetic unit 30 (transport controller 301, etc.).

When a new conveyed object is placed on the transport path of conveyor device 2 and inventory sensor 8 switches ON, transport controller 301 causes identifier information ID for identifying and distinguishing that conveyed object from other conveyed objects to be assigned to that conveyed object. Transport controller 301 sends conveyed object information indicating the identifier information ID and transport destination A of that conveyed object to the local controller ZC of the zone Z at which that conveyed object was placed.

Note that it is also possible for the identifier information ID to have been assigned to the conveyed object in advance. For example, it might be the case that an ID tag, barcode, or the like indicating the identifier information ID has been attached to the conveyed object. In addition, conveyor system 1 may be provided with a reader device for the ID tag, barcode, or the like. Transport controller 301 may use a reader device to acquire the identifier information ID from the conveyed object.

Furthermore, when the conveyed object is conveyed to an adjacent zone Z, that conveyed object information is sent to the next local controller ZC which is adjacent thereto. As a result, the local controller ZC of each zone Z is capable of knowing the identifier information ID and transport destination of any conveyed object that is being conveyed within its zone. Conveyed object information may be sent directly to the next zone Z from the zone Z from which it is being conveyed, or it may be sent to the next zone Z from the zone Z from which it is being conveyed by way of host controller 3.

Removal processor 302, abnormality history storage processor 303, motor current storage processor 304, first abnormality counter 307, second abnormality counter 308, first self-diagnostic unit 309, second self-diagnostic unit 310, third self-diagnostic unit 311, and triggering condition corrector 312 are described below.

Figure 6:
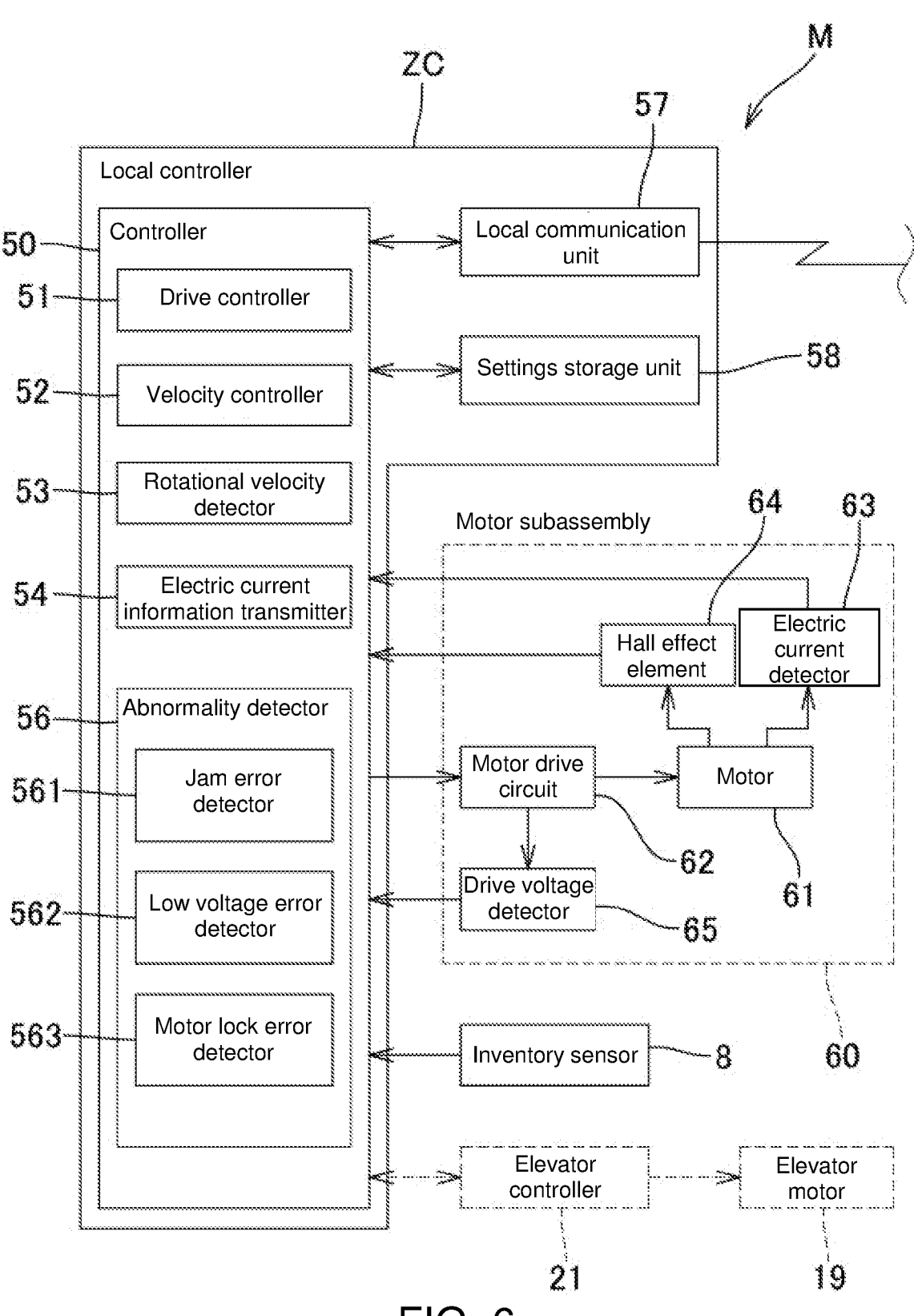
FIG. 6 is a block diagram showing exemplary electrical constitution of a conveyor module for a zone shown in FIG. 1.

FIG. 6 is a block diagram showing exemplary electrical constitution of a conveyor module M for a zone Z shown in FIG. 1. Constituents common to forward conveying modules Ms employed at forward zones and direction changing modules Mt employed at direction changing zones are shown in solid line; constituents provided only at direction changing modules Mt are shown in broken line.

Conveyor module M is provided with local controller ZC, motor subassembly 60, and inventory sensor 8. Direction changing module Mt is additionally provided with elevator controller 21 and elevator motor 19.

Local controller ZC is provided with controller 50, local communication unit 57, and settings storage unit 58. Motor subassembly 60 is provided with motor 61, motor drive circuit 62, electric current detector 63, drive voltage detector 65, and Hall effect element 64.

Local communication unit 57 is a communication interface circuit employing the same communication protocol as communication interface unit 34 at host controller 3. Local communication unit 57 is constituted so as to be capable of transmission and reception of data with host controller 3 and with other local controllers ZC by way of communication cable(s) and/or the like. Local communication unit 57 has an address which has been established for it.

Below, communication by controller 50 (drive controller 51, velocity controller 52, rotational velocity detector 53, electric current information transmitter 54, and abnormality detector 56) with host controller 3 and with other zones Z by way of local communication unit 57 is referred to simply as communication, acquisition, access, and so forth by controller 50 (drive controller 51, etc.).

Stored at settings storage unit 58 are velocity setting, jam determination time tj, drive determination voltage Vdref, rotation determination time trref, and local address information.

The velocity setting indicates the velocity at which a conveyed object should be conveyed by its zone Z. Jam determination time tj is the determination time for determining that there has been a jam error (jam) based on the time during which a conveyed object has been detected by inventory sensor 8. Drive determination voltage Vdref is the baseline voltage value for determining that a low voltage error has occurred. Rotation determination time trref is the baseline time for determining that a motor lock error has occurred.

Controller 50 might, for example, be constituted by employment of a CPU that executes prescribed arithmetic operations; RAM that stores data temporarily; flash memory or other such nonvolatile storage unit; a timer circuit, circuits peripheral with respect thereto, and/or the like. Settings storage unit 58 is constituted from the aforementioned storage unit and/or the like.

By executing control programs stored in the aforementioned storage unit and/or the like, controller 50 functions as drive controller 51, velocity controller 52, rotational velocity detector 53, electric current information transmitter 54, and abnormality detector 56 (event detector).

Motor 61 at forward conveying module Ms is a motor that drives drive roller 5a of forward conveying module Ms. This motor 61 is internal to drive roller 5a. Direction changing module Mt is provided with two motor subassemblies 60. The motor 61 of one motor subassembly 60 is a motor that drives drive roller 15 of main transport conveyor 11, and the motor 61 of the other motor subassembly 60 is a motor that drives roller 16 of subordinate transport conveyor 12.

Motor drive circuit 62 is what is referred to as a motor driver circuit. Motor drive circuit 62 drives motor 61 in correspondence to control signals from controller 50. Drive voltage detector 65, which is what is referred to as a voltage detection circuit, might, for example, be constituted by employment of a voltage divider resistance and an analog-to-digital converter.

Electric current detector 63 detects the motor current Im that flows through motor 61. Electric current detector 63, which is what is referred to as an electric current detection circuit, might, for example, be constituted by employment of a shunt resistance and an analog-to-digital converter.

Drive voltage detector 65 detects the voltage that exists between the input terminals of motor drive circuit 62, i.e., the drive power supply voltage Vd that is supplied from the power supply to motor drive circuit 62, and outputs that detected value to controller 50.

Hall effect element 64 is arranged in opposed fashion with respect to the magnet(s) of the rotor of motor 61. By so doing, it will be the case that rotation of motor 61 causes the magnet(s) of the rotor and Hall effect element 64 to alternately mutually approach and recede. As a result, when motor 61 rotates, the signal output from Hall effect element 64 will be a pulsed signal in which a high level and a low level are produced in repeating fashion in correspondence to the rotation of motor 61. Note that any of various sensors capable of measuring the rotational velocity of motor 61 may be used instead of Hall effect element 64.

By controlling the driving of motor 61 by way of motor drive circuit 62, drive controller 51 controls transport of the conveyed object by its zone Z.

Velocity controller 52 outputs instruction signals to motor drive circuit 62 and controls the rotational velocity Vr of motor 61 so as to cause the velocity at which a conveyed object in its zone Z is conveyed to be a velocity indicated by a velocity setting stored at settings storage unit 58 or that of a velocity instruction from host controller 3.

Rotational velocity detector 53 detects the rotational velocity Vr of motor 61 by counting the number of pulses in the pulsed signal that is output from Hall effect element 64 within a prescribed time. Note that rotational velocity detector 53 need not be provided. The velocity indicated by the instruction signal from velocity controller 52 may be employed as rotational velocity Vr.

During the period when the inventory sensor 8 at its zone Z is switched ON, i.e., while a conveyed object is being conveyed at its zone, electric current information transmitter 54 causes electric current information to be sent to host controller 3 in the form of the rotational velocity Vr and the motor current Im detected at its zone in association with the identifier information ID of the conveyed object being conveyed and the address of its zone.

Characteristic aspects of direction changing module Mt are described below. Elevator controller 21 is constituted by employment of what is referred to as a microcomputer. By driving elevator motor 19 in correspondence to direction instructions signals indicating instructions regarding transport direction from controller 50, elevator controller 21 causes direction changing module Mt to change orientations such that it is in either a forward orientation or a direct changing orientation.

By controlling elevator controller 21 and roller 16 of subordinate transport conveyor 12 and drive roller 15 of main transport conveyor 11, drive controller 51 of direction changing module Mt controls transport in respective directions.

Below, common to forward conveying module Ms and direction changing module Mt is detection by abnormality detector 56 of triggering events in the form of abnormalities occurring due to conveyed objects. Abnormality detector 56 corresponds to an example of an event detector. Because abnormality detectors 56 are provided at respective zones Z, abnormalities will be detected at a plurality of locations along the transport path of conveyor device 2 by the abnormality detectors 56 at the respective zones Z. The plurality of zones Z correspond to an example of a plurality of locations.

Abnormality detector 56 includes jam error detector 561, low voltage error detector 562, and motor lock error detector 563.

Jam error detector 561 detects jam errors in the form of jams in which a conveyed object becomes incapable of being conveyed during the course of transport of the conveyed object by conveyor device 2.

More specifically, jam error detector 561 monitors inventory sensor 8, and detects a jam error abnormality in its zone when inventory sensor 8 is continuously ON for a time exceeding jam determination time tj stored at settings storage unit 58. In addition, jam error detector 561 sends error information associating the jam error and the identifier information ID of the conveyed object that is being conveyed and the address of its zone to host controller 3.

Low voltage error detector 562 detects a low voltage error abnormality in its zone when drive power supply voltage Vd detected by drive voltage detector 65 falls below drive determination voltage Vdref stored at settings storage unit 58. In addition, low voltage error detector 562 sends error information associating the low voltage error and the identifier information ID of the conveyed object that is being conveyed and the address of its zone to host controller 3.

Motor lock error detector 563 measures the dwell time tc of a state in which no pulsed signal is output from Hall effect element 64 while drive controller 51 is carrying out control such as should cause motor 61 to rotate. What is referred to as a state in which no pulsed signal is output from Hall effect element 64 is, in other words, nothing other than a state in which motor 61 is stopped. Accordingly, dwell time tc is the time during which motor 61 is stopped while drive controller 51 is carrying out control such as should cause motor 61 to rotate.

In addition, motor lock error detector 563 detects a motor lock error abnormality in its zone when dwell time tc exceeds rotation determination time trref. In addition, motor lock error detector 563 sends error information associating the motor lock error and the identifier information ID of the conveyed object that is being conveyed and the address of its zone to host controller 3.

Note that there is no limitation to examples in which abnormality detectors 56 are provided at respective zones Z. For example, host controller 3 may be provided with an abnormality detector that detects abnormalities in respective zones Z. Instead of being provided with abnormality detectors 56, respective zones Z might send information necessary for detection of abnormalities to host controller 3.

When a triggering event detected by abnormality detector 56 or electric current detector 63 satisfies a preestablished triggering condition, removal processor 302 of host controller 3 causes the conveyed object to be removed from the transport path by causing that conveyed object to be conveyed to any of removal areas B1 through B4 by conveyor mechanism MC of conveyor device 2.

Triggering events are, as will be described below, occurrences of jam errors, low voltage errors, motor lock errors, and other such abnormalities, and motor currents Im flowing through motors 61 of respective zones Z.

Abnormality history storage processor 303 causes the aforementioned error information which is sent from the respective local controllers ZC to be stored at abnormality history storage unit 36.

FIG. 7 is an explanatory diagram showing exemplary error information that might be stored at abnormality history storage unit 36. FIG. 7 shows an example of error information pertaining to jam errors. And with respect to low voltage errors and motor lock errors as well, in similar fashion as at FIG. 7, locations (zones) at which abnormalities have occurred, and identifier information ID for the conveyed objects that were being conveyed when those abnormalities occurred, are stored in associated fashion at abnormality history storage unit 36.

Motor current storage processor 304 causes the aforementioned electric current information which is sent from the respective local controllers ZC to be stored at motor current storage unit 37. FIG. 8 is an explanatory diagram showing exemplary electric current information that might be stored at motor current storage unit 37. As shown in FIG. 8, information (addresses) indicating zones in which electric current has been detected, identifier information ID of conveyed objects being conveyed in those zones, rotational velocities Vr of motors 61 during transport of those conveyed objects, and motor currents Im flowing through motors 61 at such times are sequentially sent from respective local controllers ZC and are stored at motor current storage unit 37.

First abnormality counter 307 counts first abnormality counts CT1 which are the number of times that an abnormality due to a single conveyed object, i.e., a conveyed object having identical identifier information ID, is detected by any of abnormality detectors 56 at respective zones Z during the course of transport of that conveyed object.

Second abnormality counter 308 counts second abnormality counts CT2 which, for each location (zone), is the number of times that an abnormality is detected by abnormality detector 56 at that zone during the course of sequentially transporting a plurality of conveyed objects therethrough.

When the second abnormality count CT2 of any of the respective zones Z exceeds a preestablished second abnormality determination count C2*j*, then a determination is made by first self-diagnostic unit 309 that there has been occurrence of trouble in that zone Z.

For a zone of interest which is any one among the plurality of zones Z, if the motor current Im at the zone of interest (motor current of interest) exceeds a first electric current value I1 and the motor current of interest is greater than the sum of a reference motor current Ir, which is based on motor current(s) Im at zone(s) upstream from the zone of interest, and a first electric current value width I1*w*, a determination is made by second self-diagnostic unit 310 that there has been occurrence of trouble in the zone of interest.

First electric current values I1 and second electric current values I2, described below, might, for example, be stored in advance at motor current storage unit 37 in the form of a lookup table, i.e., as preestablished values, in correspondence to rotational velocity of motor 61.

Figures 9, 10:
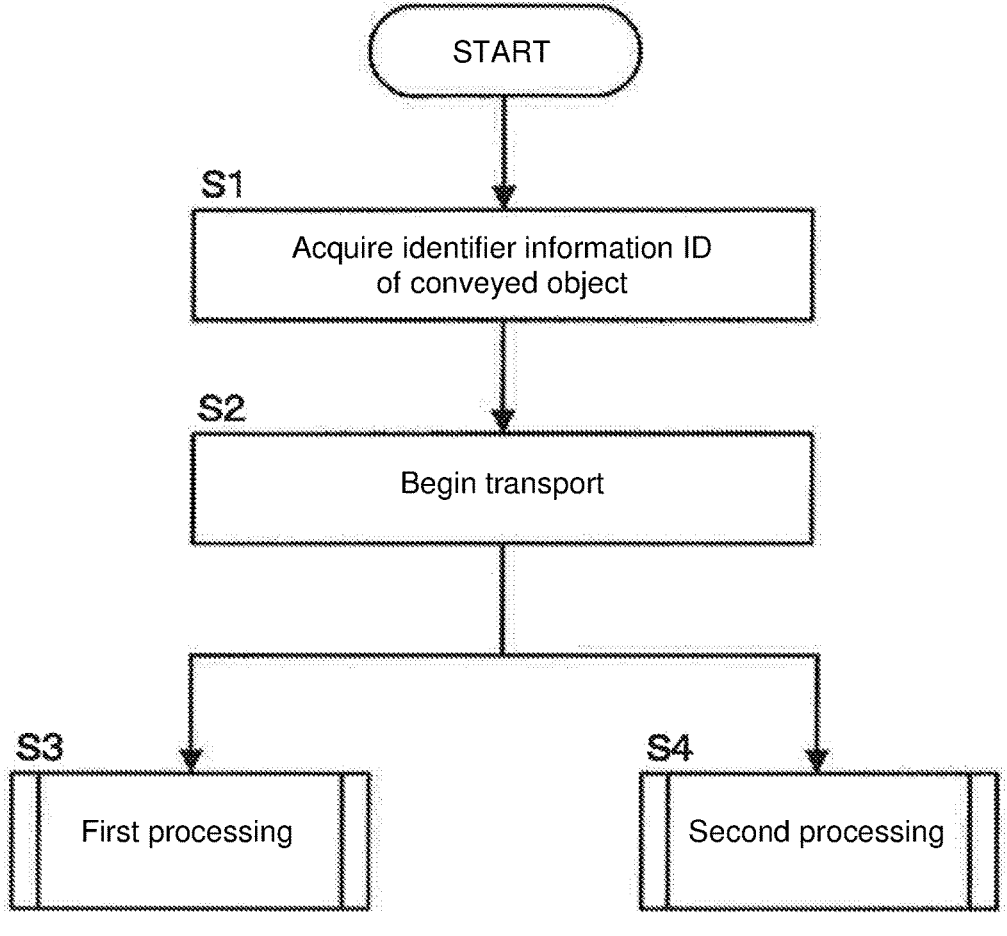
FIG. 9 is an explanatory diagram of a lookup table showing exemplary first electric current values and second electric current values.
FIG. 10 is a flowchart showing exemplary operations that might occur at the conveyor system shown in FIG. 1.

FIG. 9 is an explanatory diagram of a lookup table showing exemplary first electric current values I1 and second electric current values I2. In the example shown in FIG. 9, host controller 3 or local controller ZC would carry out control of the rotational velocity of motor 61 in three steps, these being 1400 rpm, 2200 rpm, and 3000 rpm. First electric current values I1 and second electric current values I2 are therefore preestablished in correspondence to the three steps of rotational velocity which are 1400 rpm, 2200 rpm, and 3000 rpm.

For example, the upper limit of the electric current that flows when motor 61 is rotating at a prescribed rotational velocity under normal circumstances might be taken to be the first electric current value I1 corresponding to that rotational velocity. Furthermore, for example, the lower limit of the electric current that flows when motor 61 is rotating at a prescribed rotational velocity under normal circumstances might be taken to be the second electric current value I2 corresponding to that rotational velocity.

Moreover, first electric current value I1 and second electric current value I2 may be associated with a range of rotational velocities of a given width. For example, first electric current value I1 and second electric current value I2 might be established in such fashion that first electric current value I1 is 1.3 A and second electric current value I2 is 0.9 A for the range of rotational velocities greater than 1000 rpm but less than or equal to 1400 rpm, and such that first electric current value I1 is 1.7 A and second electric current value I2 is 1.3 A for the range of rotational velocities greater than 1400 rpm but less than or equal to 2200 rpm.

As reference motor current Ir, it is preferred to use a motor current Im which, among the motor current(s) Im at zone(s) upstream from the zone of interest, is a motor current Im for which the rotational velocity Vr and identifier information ID associated therewith are the same as the rotational velocity Vr and identifier information ID of the zone of interest.

Where there are a plurality of motor currents Im which, among the motor currents Im at zones upstream from the zone of interest, are motor currents Im for which the rotational velocity Vr and identifier information ID associated therewith are the same as the rotational velocity Vr and identifier information ID of the zone of interest, that motor current Im which, among the plurality of motor currents Im, is the motor current Im of the zone that is closest to the zone of interest might be used as the reference motor current Ir. Alternatively, the average of that plurality of motor currents Im might be taken to be the reference motor current Ir, or ay desired motor current Im among that plurality of motor currents Im might be taken to be the reference motor current Ir.

Motor current Im varies in correspondence to rotational velocity Vr. Furthermore, it will also vary depending on the weight, ease of sliding, and so forth of the conveyed object that is being conveyed. To address this, by causing reference motor current Ir to be a motor current Im which, among the motor current(s) Im at zone(s) upstream from the zone of interest, is a motor current Im for which the rotational velocity Vr and identifier information ID associated therewith are the same as the rotational velocity Vr and identifier information ID of the zone of interest, it is possible to use reference motor current Ir as an approximate baseline against which to judge the reasonableness of motor current Im.

It being sufficient that the reference motor current Ir indicate the approximate electric current level of a motor current Im for which the rotational velocity Vr and identifier information ID associated therewith are the same as the rotational velocity Vr and identifier information ID of the zone of interest, where there are a plurality of motor currents Im which, among the motor currents Im at zones upstream from the zone of interest, are motor currents Im for which the rotational velocity Vr and identifier information ID associated therewith are the same as the rotational velocity Vr and identifier information ID of the zone of interest, any of various electric current values based on that plurality of motor currents Im may be used as the reference motor current Ir.

Moreover, the reference motor current Ir may be any motor current Im selected from among the motor current(s) Im at zone(s) upstream from the zone of interest which is a motor current Im for which the identifier information ID is the same as that of the zone of interest regardless of the rotational velocity Vr thereof, or it may be any motor current Im selected from among the motor current(s) Im at zone(s) upstream from the zone of interest which is a motor current Im for which the rotational velocity Vr is the same as that of the zone of interest regardless of the identifier information ID thereof.

Furthermore, the reference motor current Ir may be any motor current Im selected from among the motor current(s) Im at zone(s) upstream from the zone of interest regardless of the identifier information ID and the rotational velocity Vr thereof.

If the motor current Im in the zone of interest (motor current of interest) is less than second electric current value I2 and the motor current of interest is less than the value which is the reference motor current Ir minus the second electric current value width I2$w$, a determination is made by third self-diagnostic unit 311 that a belt is loose in the zone of interest.

To distinguish between the change in motor current Im due to the state of the conveyed object and the change in motor current Im due to abnormalities at conveyor mechanism MC, testing might, for example, be carried out in advance to determine the values that will be established for use as first electric current value width I1$w$ and second electric current value width I2$w$.

During a period when a conveyed object is not being conveyed by a drive force from at least one among a plurality of motors 61 provided at a plurality of zones, triggering condition corrector 312 corrects triggering conditions in correspondence to motor current Im detected by electric current detector 63 from that at least one motor 61.

More specifically, triggering condition corrector 312 corrects first electric current value I1 at the second triggering condition, and second electric current value I2 at the third triggering condition.

It is known that motor current Im has temperature dependency. For example, if the temperature of motor 61 rises due to an increase in ambient temperature or the like, motor current Im will decrease. Furthermore, if the temperature of motor 61 decreases due to a decrease in ambient temperature or the like, motor current Im will increase. Because motor current Im also varies depending on the magnitude of the load thereon, the temperature of motor 61 will be reflected by the motor current Im measured during a period when the motor 61 in a zone through which no conveyed object is being conveyed is made to rotate at a preestablished default rotational velocity Vs.

A zone through which no conveyed object is being conveyed might, for example, be a zone at which inventory sensor 8 is OFF.

Accordingly, during a period when the motor 61 in a zone at which inventory sensor 8 is OFF is made to rotate at default rotational velocity Vs, for example, triggering condition corrector 312 might acquire nonconveying electric current value Is which is the motor current detected by electric current detector 63 from that motor 61. In addition, triggering condition corrector 312 might correct first electric current value I1 and second electric current value I2 so as to cause first electric current value I1 and second electric current value I2 to be greater the greater that the nonconveying electric current value Is is. This will make it possible to reduce the effect of temperature on motor current Im, and to improve the precision with which judgments are made in conveying a conveyed object through a transport area.

Operation of a conveyor system 1 constituted as described above will now be described. FIG. 10 through FIG. 15 are flowcharts showing exemplary operations that might occur at conveyor system 1 shown in FIG. 1. First, when a new conveyed object is placed on the transport path of conveyor device 2 and inventory sensor 8 switches ON, transport controller 301 causes identifier information ID for identifying and distinguishing that conveyed object from other conveyed objects to be assigned to that conveyed object. Transport controller 301 acquires the identifier information ID that has thus been assigned to the conveyed object (step S1). As described above, note that transport controller 301 may use a reader device to acquire the identifier information ID from the conveyed object.

Next, transport controller 301 causes transport of the conveyed object by conveyor device 2 to begin (step S2). As described above, the local controller ZC of each zone Z is capable of knowing the identifier information ID and transport destination of any conveyed object that is being conveyed within its zone.

Figure 11:
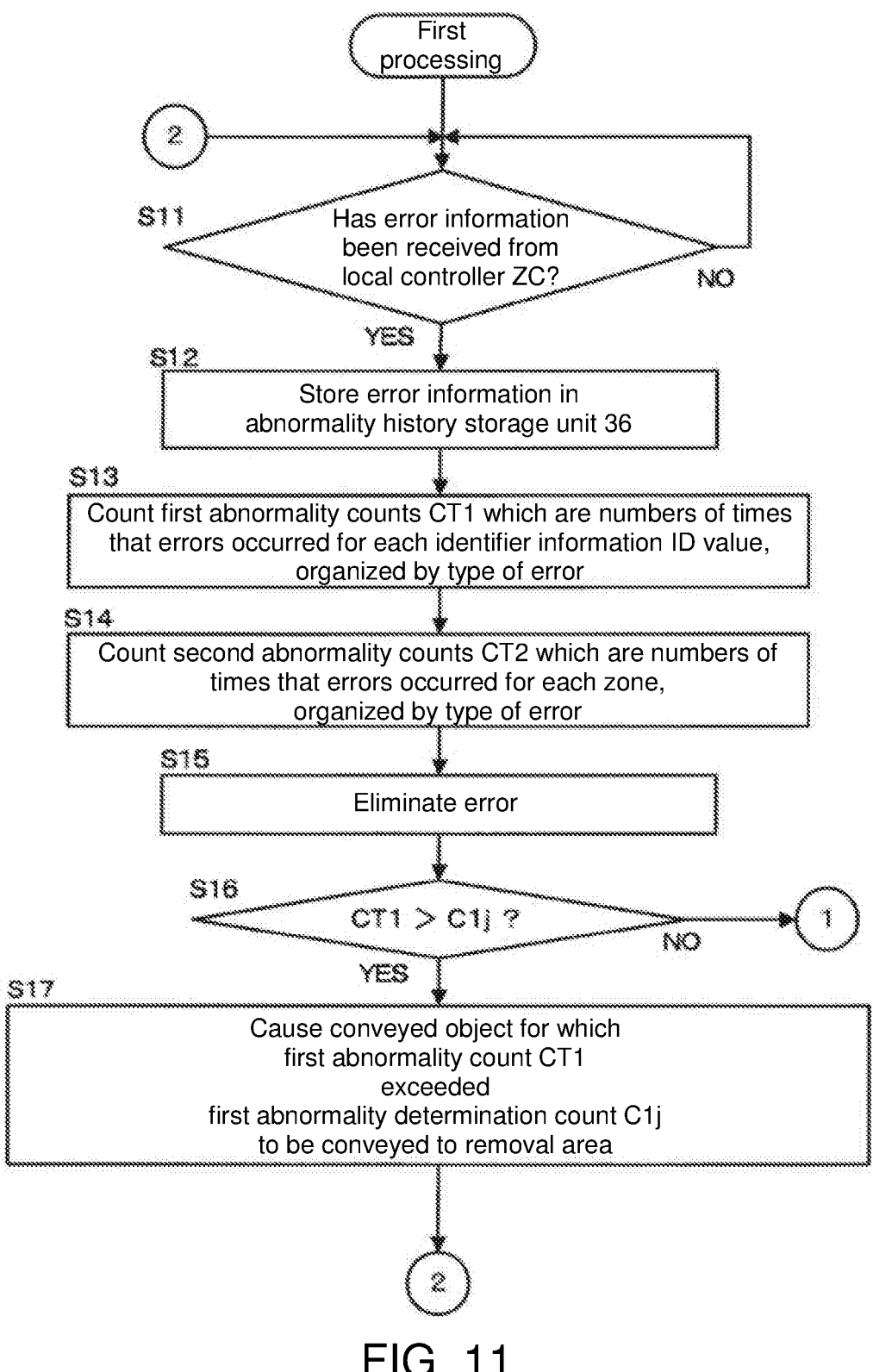
FIG. 11 is a flowchart showing exemplary operations that might occur at the conveyor system shown in FIG. 1.
Figure 12:
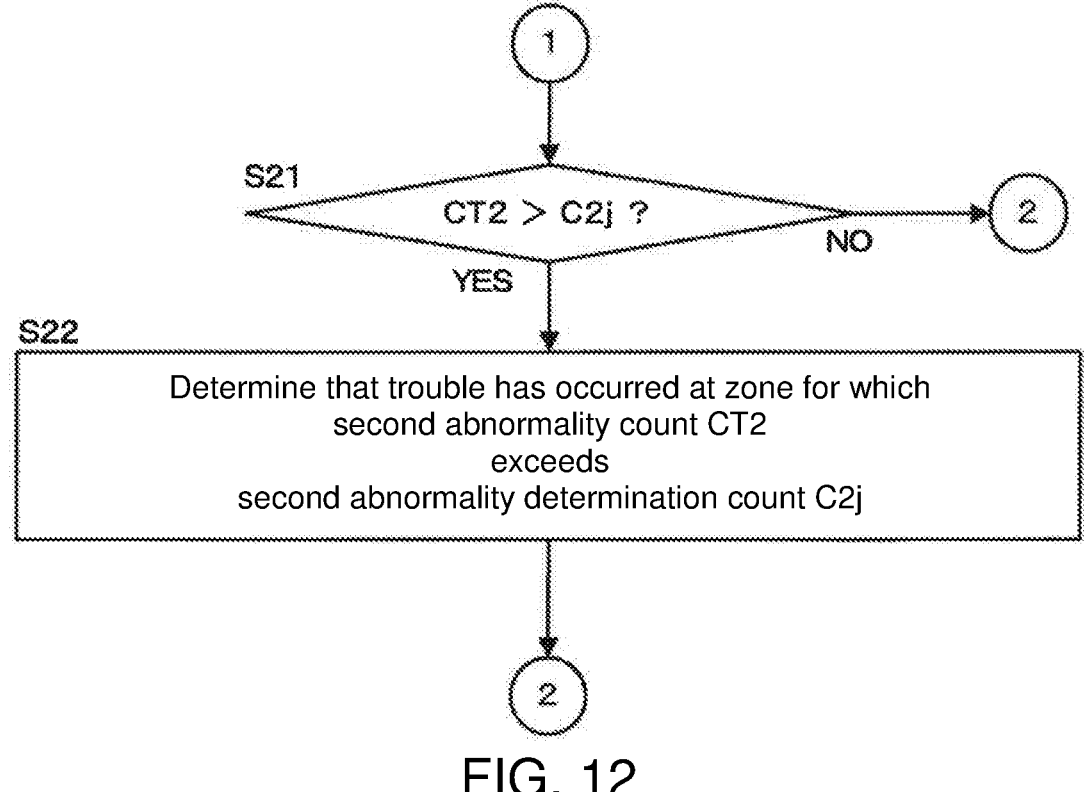
FIG. 12 is a flowchart showing exemplary operations that might occur at the conveyor system shown in FIG. 1.
Figure 13:
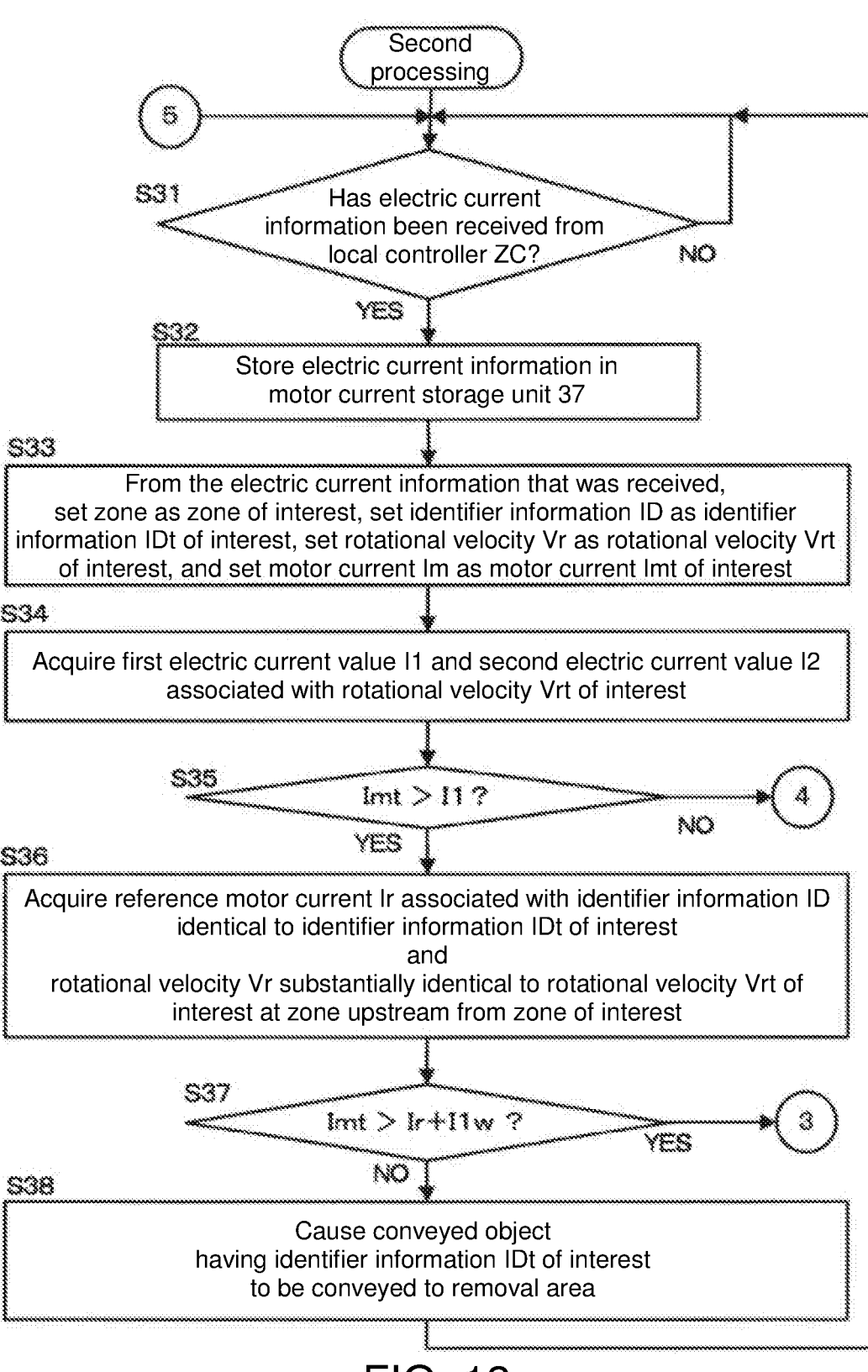
FIG. 13 is a flowchart showing exemplary operations that might occur at the conveyor system shown in FIG. 1.
Figure 14:
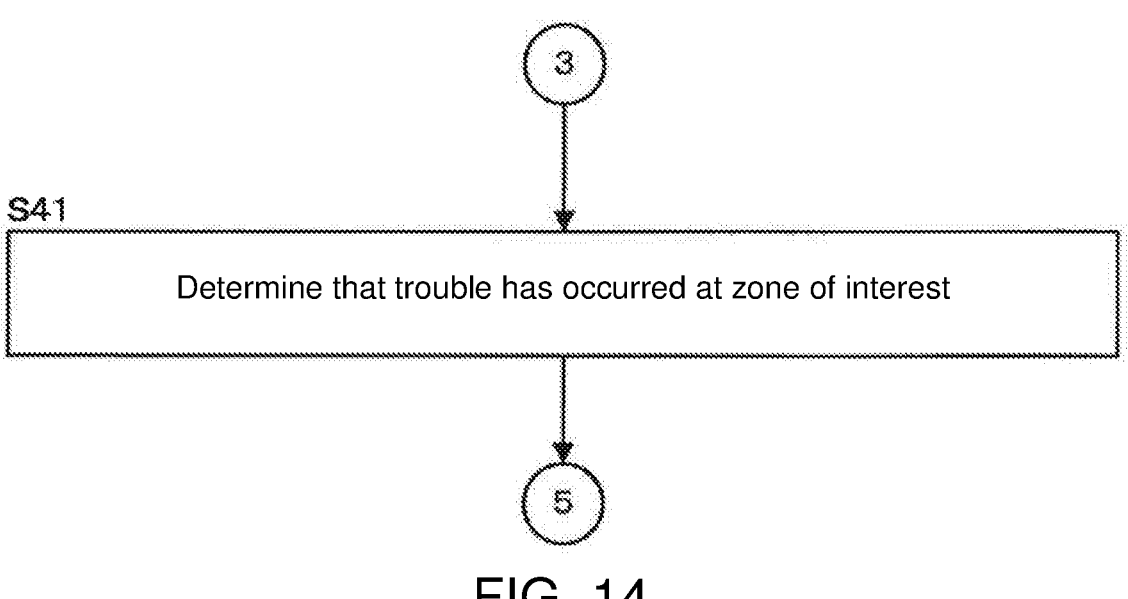
FIG. 14 is a flowchart showing exemplary operations that might occur at the conveyor system shown in FIG. 1.
Figure 15:
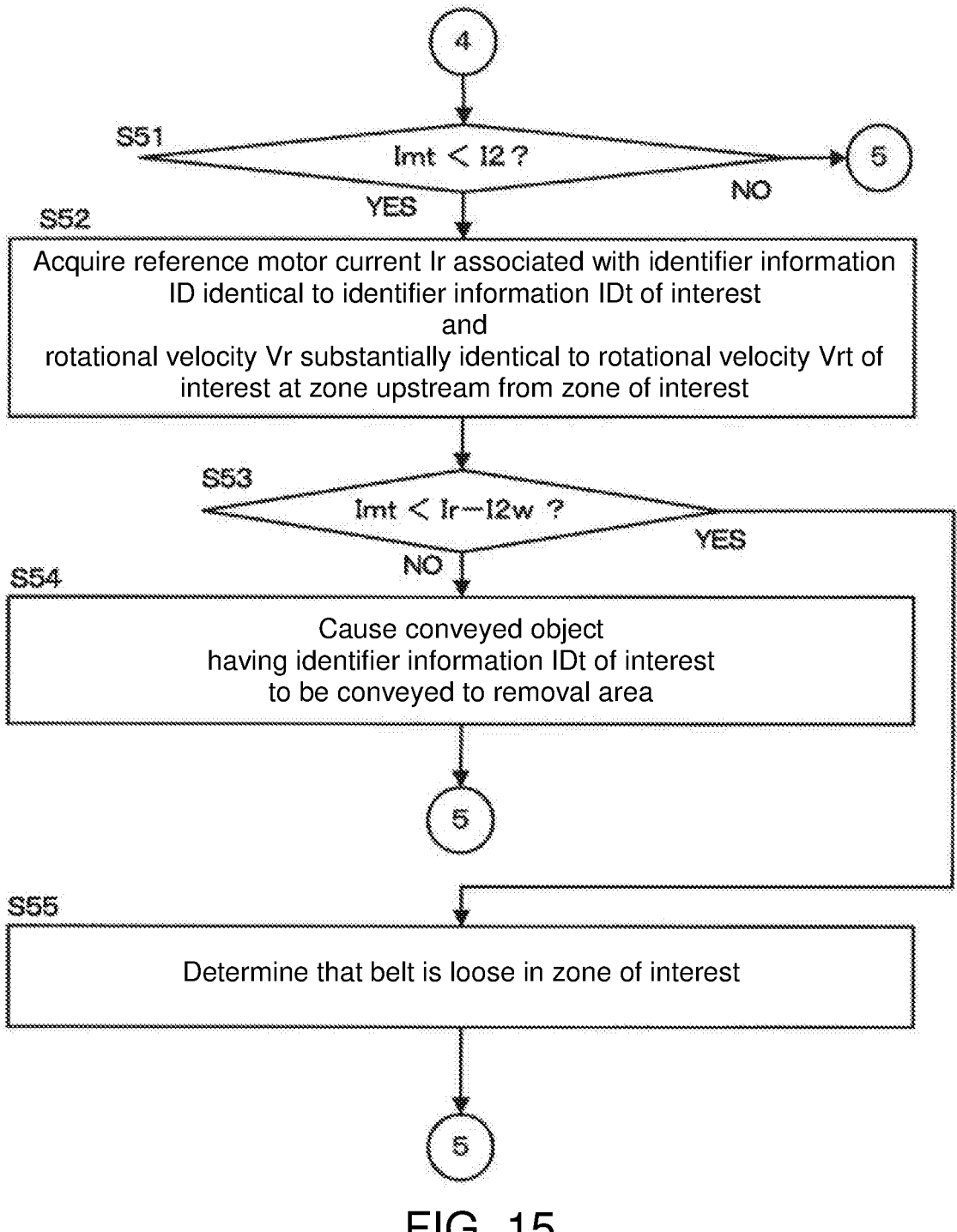
FIG. 15 is a flowchart showing exemplary operations that might occur at the conveyor system shown in FIG. 1.

Next, host controller 3 causes first processing (step S3) and second processing (step S4) to be carried out in parallel fashion. FIG. 11 and FIG. 12 show exemplary first processing, and FIG. 13 through FIG. 15 show exemplary second processing.

At the first processing, abnormality history storage processor 303 monitors to determine whether error information from any of local controllers ZC has been received by host controller 3 (step S11). If error information has been received (YES at step S11), abnormality history storage processor 303 causes that error information to be stored at abnormality history storage unit 36 (step S12). As a result, a history of occurrence of abnormalities such as that shown for example in FIG. 7 is stored at abnormality history storage unit 36.

Note that abnormalities other than jam errors have been omitted from what is shown in FIG. 7. Below, the flowcharts are described in terms of the example of jam errors, which are taken to be representative of abnormalities.

Next, to obtain first abnormality counts CT1, first abnormality counter 307 counts numbers of occurrences of errors associated with identical values of identifier information ID, i.e., the number of occurrences of abnormalities for each value of identifier information ID, organized by type of error, based on error information sent from local controllers ZC. First abnormality counter 307 causes those first abnormality counts CT1 to be stored at abnormality history storage unit 36 in association with identifier information ID (step S13).

A first abnormality count CT1 is none other than the number of times that an abnormality due to any one given conveyed object is detected by any of abnormality detectors 56 at respective zones Z during the course of transport of that conveyed object.

FIG. 16 is an explanatory diagram showing exemplary first abnormality counts CT1 that might be stored at abnormality history storage unit 36 by first abnormality counter 307. For example, based on the error information shown in FIG. 7, first abnormality counter 307 might count a first abnormality count CT1 of 1 for the conveyed objects having identifier information ID values of 2, 5, 7, and 8; might count a first abnormality count CT1 of 2 for the conveyed object having an identifier information ID value of 3; and might count a first abnormality count CT1 of 3 for the conveyed object having an identifier information ID value of 9. As a result, the first abnormality counts CT1 shown in FIG. 16 might be obtained.

Next, to obtain second abnormality counts CT2, second abnormality counter 308 counts the number of occurrences of abnormalities at each zone, organized by type of error, based on error information sent from local controllers ZC. Second abnormality counter 308 causes those second abnormality counts CT2 to be stored at abnormality history storage unit 36 in association with addresses or the like indicating zones (step S14).

FIG. 17 is an explanatory diagram showing exemplary second abnormality counts CT2 that might be stored at abnormality history storage unit 36 by second abnormality counter 308. For example, based on the error information shown in FIG. 7, second abnormality counter 308 might count a second abnormality count CT2 of 1 for zones Z2, Z7, Z8, Z10, Z14, and Z22; and might count a second abnormality count CT2 of 3 for zone Z5. As a result, the second abnormality counts CT2 shown in FIG. 17 might be obtained.

Next, a jam error might be eliminated either manually or automatically (step S15). As a result, transport of the conveyed object that produced the jam might continue.

Next, removal processor 302 compares first abnormality count CT1 with first abnormality determination count C1*j* (step S16). If first abnormality count CT1 exceeds first abnormality determination count C1*j* (YES at step S16), removal processor 302 carries out processing for removal of the conveyed object for which the first abnormality count CT1 exceeded the first abnormality determination count C1*j* by causing it to be transported to a removal area (step S17), and processing returns to step S11.

During first processing, the triggering event is an abnormality occurring due to a conveyed object (jam error, low voltage error, motor lock error), and the triggering condition is when first abnormality count CT1 exceeds first abnormality determination count C1*j* (first triggering condition).

When first abnormality count CT1 exceeds first abnormality determination count C1*j*, i.e., when the same conveyed object produces multiple jam errors (jams), it is highly likely that the reason that there is a tendency for jams to occur lies with the conveyed object itself, such as might be the case if that conveyed object is such that the box is damaged or it is slender in shape or is otherwise of a shape that tends to get caught, or if cord used in packaging has come loose or if the shape thereof is such as will make it tend to rotate or wobble in unstable fashion. Removal processor 302 makes it possible to cause a conveyed object that is suspected of being damaged or the like to be selectively transported during the course of its transport by conveyor device 2 to a removal area which is different from its original transport destination. This makes it possible to improve convenience from the standpoint of the user.

When such a conveyed object is continuously conveyed along a transport route of, say, 1 km or more, there will be frequent occurrences of jams. If even one of the conveyed objects being conveyed by conveyor device 2 experiences a jam, this will cause occurrence of trouble with transport of the other conveyed objects as well. In such situations as well, if a removal area is provided at a location which is upstream relative to the transport destination, it will be possible to cause a conveyed object that is likely to cause a jam to be removed at a location which is upstream relative to the original transport destination This will make it possible to improve the overall transport efficiency of conveyor device 2.

First abnormality determination count C1*j* may be chosen as appropriate in correspondence to the need to remove conveyed objects and so forth. For example, where a first abnormality determination count C1*j* of 2 is employed, and taking the case of the first abnormality counts CT1 shown in FIG. 16, the first abnormality count CT1 of the conveyed object having an identifier information ID value of 9 would cause the first abnormality determination count C1*j* to be exceeded. And based on the error information shown in FIG. 7, the third jam error would occur at zone Z7.

Accordingly, the current location of the conveyed object would be zone Z7. If the transport destination of that conveyed object were, say, transport destination A1, then removal processor 302 might remove that conveyed object by causing it to be transported to either removal area B2 or B3, these being along the transport route from zone Z7 to transport destination A1. First abnormality determination count C1*j* may be set to any value greater than or equal to 0. When first abnormality determination count C1*j* is 0, then even one occurrence of an error will result in removal of that conveyed object.

Where there are a plurality of removal areas, note that it is preferred that removal processor 302 cause removal to occur at the removal area for which the conveyed distance from the current location is shortest. By causing removal to occur at the removal area for which conveyed distance is shortest, it will be possible to cause a conveyed object that has a high likelihood of causing a jam error to be removed all the more quickly. In the situation described above, it would be preferred that the conveyed object be removed at removal area B2, conveyed distance to which is shorter from zone Z7 than would be the case for removal area B3.

For example, to cause the conveyed object having an identifier information ID value of 9 to be removed at removal area B2, removal processor 302 might send an instruction to local controller ZC12 of zone Z12, which branches to the distribution target which is removal area B12, to cause the removal target, which is the conveyed object having an identifier information ID value of 9, to be conveyed to removal area B2.

On the other hand, at step S16, if first abnormality count CT1 does not exceed first abnormality determination count C1*j* (NO at step S16), first self-diagnostic unit 309 compares second abnormality count CT2 with second abnormality determination count C2*j* (step S21). If second abnormality count CT2 does not exceed second abnormality determination count C2*j* (NO at step S21), then because it may be assumed that there is no problem with either the conveyed object or the transport path, first self-diagnostic unit 309 causes processing to return to step S11.

On the other hand, if second abnormality count CT2 exceeds second abnormality determination count C2*j* (YES at step S21), then because it may be assumed that it is highly likely that an abnormality has occurred at the conveyor module M or the like for that zone, first self-diagnostic unit 309 causes a determination to be made, for the zone for which second abnormality count CT2 exceeded second abnormality determination count C2*j*, that there has been occurrence of trouble that is dependent on the location at which the abnormality occurred (step S22).

Second abnormality determination count C2*j* may be chosen as appropriate in correspondence to the degree of reliability or the like which is required of conveyor system 1. For example, where a second abnormality determination count C2*j* of 2 is employed, and taking the case of the second abnormality counts CT2 shown in FIG. 17, the second abnormality count CT2 would exceed the second abnormality determination count C2*j* at zone Z5. Accordingly, first self-diagnostic unit 309 would cause a determination to be made that there has been occurrence of trouble at zone Z5 (step S22). Second abnormality determination count C2*j* may be set to any value greater than or equal to 0. When second abnormality determination count C2*j* is 0, then even one occurrence of an error will result in a determination that there has been occurrence of trouble in that zone.

First self-diagnostic unit 309 reports the result of such determination to the user by, for example, causing it to be displayed at display 31 or the like, and processing returns to step S11. As a result, because the user is able to repair zone(s) in which there is occurrence of trouble, maintenance of conveyor system 1 is facilitated.

Whereas at FIG. 11 and FIG. 12 depict an example in which the number of times that a jam error has occurred is used for first abnormality count CT1 and second abnormality count CT2, note that instead of jam errors it is also possible to use the number of times that a low voltage error has occurred or the number of times that a motor lock error has occurred for first abnormality count CT1 and second abnormality count CT2.

For example, where the weight of a conveyed object is excessive, there will be an increase in the load on the motor 61 that is used to convey such a conveyed object. Increase in the load on motor 61 will cause increase in the electric current that flows through motor 61. As a result, the electric power supplied by the power supply to motor drive circuit 62 will be insufficient, and there is a possibility that there will be a decrease in drive power supply voltage Vd. In addition, if drive power supply voltage Vd falls below drive determination voltage Vdref, low voltage error detector 562 causes error information associating the low voltage error and the identifier information ID of the conveyed object that is being conveyed and the address of its zone to be sent to host controller 3.

Thus, a conveyed object that causes excessive load to be placed on motor 61 due to the fact of its excessive weight or for other such reason will have a tendency to cause jams. By therefore using the number of times that a low voltage error has occurred for first abnormality count CT1, it will be possible to discriminate with respect to an excessively heavy conveyed object during the course of its transport by conveyor device 2. This will make it possible to improve convenience from the standpoint of the user. Furthermore, if a removal area is provided at a location which is upstream relative to the transport destination, because it will also be possible where the number of times that a low voltage error has occurred is used for first abnormality count CT1 to, as was the case where jam errors were used therefor, cause a conveyed object that has a tendency to cause jams to be removed at a location which is upstream relative to the original transport destination, this will make it possible to improve the overall transport efficiency of conveyor device 2.

Furthermore, where the number of times that a low voltage error has occurred is used for second abnormality count CT2, it will likewise be possible to determine that trouble is occurring in zones in which there are reasons for occurrence of low voltage errors.

Furthermore, where, for example, a cord used in the packaging of a conveyed object has come loose, and this has become caught in any of transport roller(s) 5, drive roller(s) 15, roller(s) 16, or other such roller(s), or the conveyed object is entrained by any among such roller(s), it may happen that a roller will stop rotating. Where this is the case, the motor(s) 61 that drive the roller(s) will also become incapable of rotating. Where this is the case, a motor lock error will be detected by motor lock error detector 563, and error information associating the motor lock error and the identifier information ID of the conveyed object that is being conveyed and the address of its zone will be sent from motor lock error detector 563 to host controller 3.

Accordingly, it will also be possible where the number of times that a motor lock error has occurred is used for first abnormality count CT1 to, as was the case where jam errors were used therefor, discriminate with respect to a conveyed object that, due to the fact that a cord has come loose therefrom or the like, has a tendency to cause jams during the course of its transport by conveyor device 2. This will make it possible to improve convenience from the standpoint of the user. Furthermore, if a removal area is provided at a location which is upstream relative to the transport destination, because it will be possible to, as was the case where jam errors were used therefor, cause a conveyed object that has a tendency to cause jams to be removed at a location which is upstream relative to the original transport destination, this will make it possible to improve the overall transport efficiency of conveyor device 2.

Furthermore, where the number of times that a motor lock error has occurred is used for second abnormality count CT2, it will likewise be possible to determine that trouble is occurring in zones in which there are reasons for occurrence of motor lock errors.

Note that abnormality history storage processor 303 need not be provided, nor need there be storage of a history of error information such as is shown in FIG. 7. In addition, at steps S13 and S14, first abnormality counter 307 and second abnormality counter 308 may directly count first abnormality count CT1 and second abnormality count CT2 based on error information sent thereto from local controllers ZC, and may cause these to be stored as shown in FIG. 16 and FIG. 17.

Note that conveyor device 2 is limited neither to examples in which there is division into a plurality of zones nor is it limited to examples in which abnormalities are detected separately for each zone. It is sufficient that the abnormality detectors detect abnormalities at a plurality of locations along the transport path of conveyor device 2, and it is sufficient that second abnormality counter 308 carry out counting of second abnormality counts CT2 separately for each of those locations.

Furthermore, conveyor system 1 need not be provided with either second abnormality counter 308 or first self-diagnostic unit 309. In addition, it is also possible not to execute steps S14, S21, and S22 but to instead proceed to step S11 when the result of evaluation at step S16 is NO.

Second processing shown in FIG. 13 through FIG. 15 will now be described. Motor current storage processor 304 monitors to determine whether electric current information from any of local controllers ZC has been received by host controller 3 (step S31). If electric current information has been received (YES at step S31), motor current storage processor 304 causes that electric current information to be stored at motor current storage unit 37 (step S32). As a result, electric current information such as that shown for example in FIG. 8 is stored at motor current storage unit 37.

Next, from the electric current information received by host controller 3, removal processor 302 acquires zones (addresses) which it sets as zones of interest, identifier information ID values which it sets as identifier information IDt values of interest, rotational velocities Vr which it sets as rotational velocities Vrt of interest, and motor currents Im which it sets as motor currents Imt of interest (step S33). Because electric current information is sent thereto from each zone Z, each of the respective zones Z takes its turn as a zone of interest for which steps S31 through S55 are executed.

Next, removal processor 302 might, for example, access a lookup table such as is shown in FIG. 9 and acquire therefrom first electric current value I1 and second electric current value I2 associated with rotational velocity Vrt of interest (step S34). The first electric current value I1 and second electric current value I2 acquired at step S34 are used at steps S35 and S51 following correction thereof by triggering condition corrector 312.

Next, removal processor 302 compares motor current Imt of interest with first electric current value I1 (step S35). If motor current Imt of interest exceeds first electric current value I1 (YES at step S35), removal processor 302 acquires motor current Im associated with a record pertaining to a zone upstream from the zone of interest for which the rotational velocity Vr is substantially the same as the rotational velocity Vrt of interest and the identifier information ID is the same as the identifier information IDt of interest, and sets this as reference motor current Ir (step S36).

For example, taking the case where electric current information record 71 at FIG. 8 has been received, at step S33, the zone of interest would be Z4, the identifier information IDt value of interest would be 1, the rotational velocity Vrt of interest would be 2200 rpm, and the motor current Imt of interest would be 1.8 A. At step S34, referring to FIG. 9, because the rotational velocity Vrt of interest is 2200 rpm, first electric current value I1 will be 1.7 A, and second electric current value I2 will be 1.3 A.

This being the case, motor current Imt of interest (i.e., 1.8 A) will be greater than first electric current value I1 (i.e., 1.7 A) at step S35 (YES at step S35), and processing will proceed to step S36. At step S36, electric current information pertaining to zones Z1 through Z3 which are upstream from zone Z4 of interest is accessed.

Of the electric current information records pertaining to zones Z1 through Z3 at FIG. 8, electric current information records 711 and 712 are electric current information records for which rotational velocity Vr is the same as the rotational velocity Vrt of interest (i.e., 2200 rpm) and the identifier information ID is the same as the identifier information IDt of interest (i.e., 1). Among electric current information records 711 and 712, that which corresponds to the zone which is closest to zone Z4 of interest is electric current information record 712. Accordingly, at step S36, the motor current Im (i.e., 1.4 A) at electric current information record 712 might, for example, be acquired and set as reference motor current Ir.

Next, removal processor 302 compares motor current Imt of interest with (reference motor current Ir+first electric current value width I1w) (step S37). In addition, if motor current Imt of interest does not exceed (reference motor current Ir+first electric current value width I1w) (NO at step S37), removal processor 302 causes the conveyed object having the identifier information IDt value of interest to be removed by causing it to be transported to a removal area (step S38), and processing returns to step S31. The combination of a YES at step S35 and a NO at step S37 corresponds to the second triggering condition.

For example, if first electric current value width I1w is taken to be 2.0 A, then reference motor current Ir+first electric current value width I1w will be 1.4 A+2.0 A=3.4 A. This being the case, because motor current Imt of interest (i.e., 1.8 A) will not be greater than 3.4 A which is reference motor current Ir+first electric current value width I1w (NO at step S37), step S38 will be executed.

At step S38, if the transport destination of the conveyed object having the identifier information IDt value of interest (i.e., 1) is, say, transport destination A1, then removal processor 302 might remove that conveyed object by causing it to be transported to any of removal areas B1, B2, or B3, these being along the transport route from zone Z4 of interest to transport destination A1. In such case, for similar reasons as at step S17, it is preferred that removal take place at removal area B1, which among removal areas B1, B2, and B3 is that to which the conveyed distance from zone Z4 is the shortest.

On the other hand, at step S37, if motor current Imt of interest exceeds (reference motor current Ir+first electric current value width I1w) (YES at step S37), second self-diagnostic unit 310 causes a determination to be made that there has been occurrence of trouble at the zone of interest (step S41) and reports the result of such determination to the user by, for example, causing it to be displayed at display 31 or the like, and processing returns to step S31. As a result, because the user is able to repair zone(s) in which there is occurrence of trouble, maintenance of conveyor system 1 is facilitated.

For example, for electric current information record 73 in FIG. 8, the zone of interest would be Z5, the identifier information IDt value of interest would be 3, the rotational velocity Vrt of interest would be 3000 rpm, the motor current Imt of interest would be 4.2 A, the reference motor current Ir would be 1.8 A, the first electric current value I1 would be 2.0 A, and the second electric current value I2 would be 1.6 A. In such case, the fact that motor current Imt of interest (i.e., 4.2 A) is greater than first electric current value I1 (i.e., 2.0 A) means that step S35 will be evaluated as YES, and the fact that motor current Imt of interest (i.e., 4.2 A) is greater than reference motor current Ir (i.e., 1.8 A)+first electric current value width I1w (i.e., 2.0 A) means that step S37 will be evaluated as YES, and so a determination will be made that there has been occurrence of trouble at zone Z5 of interest (step S41).

For example, where the bottom of the conveyed object is uneven due to its having been damaged or the like, there will be increased friction between it and transport roller(s) 5, roller(s) 16, and belt(s) 14. If friction increases between the conveyed object and transport roller(s) 5, roller(s) 16, and belt(s) 14, then the load on motor(s) 61 that drive transport roller(s) 5, roller(s) 16, and belt(s) 14 will increase, and motor current Im will increase.

Accordingly, if motor current Imt of interest exceeds first electric current value I1 (YES at step S35), there is a possibility that the conveyed object is damaged. However, there is also a possibility that the increase in the motor current Imt of interest is due to occurrence of failure of conveyor module M or other such trouble at the zone of interest. It is in general more likely that an increase in motor current Im is due to occurrence of failure or other such trouble than that the increase in motor current Im is due to increase in friction with the conveyed object.

To address this, if motor current Imt of interest exceeds first electric current value I1 (YES at step S35) and motor current Imt of interest does not exceed (reference motor current Ir+first electric current value width I1w) (NO at step S37), then because it can be assumed that the increase in motor current Im is due to increase in friction with the conveyed object, removal processor 302 causes that conveyed object to be removed by causing it to be transported to a removal area (step S38).

As a result, because it is possible to cause a conveyed object that is possibly damaged to be discovered by conveyor system 1 and transported to a removal area, this will improve convenience from the standpoint of the user.

Furthermore, if motor current Imt of interest exceeds first electric current value I1 (YES at step S35) and motor current Imt of interest exceeds (reference motor current Ir+first electric current value width I1w) (YES at step S37), then because it can be assumed that there has been occurrence of failure or other such trouble at the zone of interest, this will facilitate maintenance of conveyor system 1 by the user.

On the other hand, at step S35, if motor current Imt of interest does not exceed first electric current value I1 (NO at step S35), then removal processor 302 compares motor current Imt of interest with second electric current value I2 (step S51). If motor current Imt of interest is not less than second electric current value I2 (NO at step S51), then because transport of the conveyed object is proceeding satisfactorily, processing returns to step S31.

On the other hand, if motor current Imt of interest is less than second electric current value I2 (YES at step S51), then, in similar fashion as at step S36, removal processor 302 acquires motor current Im associated with a record pertaining to a zone upstream from the zone of interest for which the rotational velocity Vr is substantially the same as the rotational velocity Vrt of interest and the identifier information ID is the same as the identifier information IDt of interest, and sets this as reference motor current Ir (step S52).

For example, taking the case where electric current information record 72 at FIG. 8 has been received, at steps S33 and S34, the zone of interest would be Z4, the identifier information IDt value of interest would be 2, the rotational velocity Vrt of interest would be 1400 rpm, the motor current Imt of interest would be 0.8 A, the first electric current value I1 would be 1.3 A, and the second electric current value I2 would be 0.9 A.

This being the case, motor current Imt of interest (i.e., 0.8 A) will be less than first electric current value I1 (i.e., 1.3 A) at step S35 (NO at step S35), and processing will proceed to step S51. The motor current Imt of interest (i.e., 0.8 A) will be less than second electric current value I2 (i.e., 0.9 A) at step S51 (YES at step S51), and electric current information pertaining to zones Z1 through Z3 which are upstream from zone Z4 of interest at step S52 is accessed.

Of the electric current information records pertaining to zones Z1 through Z3 at FIG. 8, electric current information records 721 and 722 are electric current information records for which rotational velocity Vr is the same as the rotational velocity Vrt of interest (i.e., 1400 rpm) and the identifier information ID is the same as the identifier information IDt of interest (i.e., 2). Among electric current information records 721 and 722, that which corresponds to the zone which is closest to zone Z4 of interest is electric current information record 722. Accordingly, at step S52, the motor current Im (i.e., 1.2 A) at electric current information record 722 would be acquired and set as reference motor current Ir.

Next, removal processor 302 compares motor current Imt of interest with (reference motor current Ir–second electric current value width I2w) (step S53). In addition, if motor current Imt of interest is not less than (reference motor current Ir–second electric current value width I2w) (NO at step S53), removal processor 302 causes the conveyed object having the identifier information IDt value of interest to be removed by causing it to be transported to a removal area (step S54), and processing returns to step S31. The combination of a YES at step S51 and a NO at step S53 corresponds to the third triggering condition.

For example, if second electric current value width I2w is taken to be 0.5 A, then reference motor current Ir–second electric current value width I2w will be 1.2 A–0.5 A=0.7 A. This being the case, because motor current Imt of interest (i.e., 0.8 A) will not be less than 0.7 A which is reference motor current Ir–second electric current value width I2w (NO at step S53), step S54 will be executed.

At step S54, if the transport destination of the conveyed object having the identifier information IDt value of interest (i.e., 2) is, say, transport destination A2, then removal processor 302 might remove that conveyed object by causing it to be transported to removal area B1 or B4, these being along the transport route from zone Z4 of interest to transport destination A2. In such case, for similar reasons as at step S17, it is preferred that removal take place at removal area B1, which among removal areas B1 and B4 is that to which the conveyed distance from zone Z4 is the shortest.

On the other hand, at step S53, if motor current Imt of interest is less than (reference motor current Ir–second electric current value width I2w) (YES at step S53), third self-diagnostic unit 311 causes a determination to be made that there is a belt loose in the zone of interest (step S55) and reports the result of such determination to the user by, for example, causing it to be displayed at display 31 or the like, and processing returns to step S31. As a result, because the user is able to repair zone(s) in which a belt is loose, maintenance of conveyor system 1 is facilitated. Belts include belts 7, 14, 17.

For example, for electric current information record 74 in FIG. 8, the zone of interest would be Z6, the identifier information IDt value of interest would be 3, the rotational velocity Vrt of interest would be 2200 rpm, the motor current Imt of interest would be 0.5 A, the reference motor current Ir would be 1.6 A, the first electric current value I1 would be 1.7 A, and the second electric current value I2 would be 1.3 A. In such case, the fact that motor current Imt of interest (i.e., 0.5 A) is less than first electric current value I1 (i.e., 1.7 A) means that step S35 will be evaluated as NO, the fact that motor current Imt of interest (i.e., 0.5 A) is less than second electric current value I2 (i.e., 1.3 A) means that step S51 will be evaluated as YES, and the fact that motor current Imt of interest (i.e., 0.5 A) is less than reference motor current Ir (i.e., 1.6 A)–second electric current value width I2w (i.e., 0.5 A) means that step S53 will be evaluated as YES, and so a determination will be made that there is a loose belt in zone Z6 of interest (step S55).

For example, when conveying a cardboard box or other such conveyed object, it is sometimes the case that the bottom grows thin or develops an increased tendency to slide during the course of being its being conveyed over a long distance. Where the bottom of a conveyed object develops an increased tendency to slide, there will be decreased friction between it and transport roller(s) 5, roller(s) 16, and belt(s) 14. If friction decreases between the conveyed object and transport roller(s) 5, roller(s) 16, and belt(s) 14, then the load on motor(s) 61 that drive transport roller(s) 5, roller(s) 16, and belt(s) 14 will decrease, and motor current Im will decrease.

Accordingly, if motor current Imt of interest is less than second electric current value I2 (YES at step S51), there is a possibility that there is occurrence of deterioration at the bottom of the conveyed object such as would be the case were it to grow thin or to develop an increased tendency to slide. However, it is also possible that such a decrease in the motor current Imt of interest could be due to a loose belt 7, 14, 17 in the zone of interest. It is in general more likely that a decrease in motor current Im is due to a loose belt than that the decrease in motor current Im is due to decrease in friction with the conveyed object.

To address this, if motor current Imt of interest is less than second electric current value I2 (YES at step S51) and motor current Imt of interest is not less than (reference motor current Ir−second electric current value width I2w) (NO at step S53), then because it can be assumed that the decrease in motor current Im is due to decrease in friction with the conveyed object, removal processor 302 causes that conveyed object to be removed by causing it to be transported to a removal area (step S54).

As a result, because it is possible to cause a conveyed object that has possibly deteriorated such that the bottom thereof has grown thin or developed an increased tendency to slide to be discovered by conveyor system 1 and transported to a removal area, this will improve convenience from the standpoint of the user.

Furthermore, if motor current Imt of interest is less than second electric current value I2 (YES at step S51) and motor current Imt of interest is less than (reference motor current Ir−second electric current value width I2w) (YES at step S53), then because it can be assumed that there is a loose belt in zone Z6 of interest, this will facilitate maintenance of conveyor system 1 by the user.

As described above, motor current Im varies depending on the weight, damage, and so forth of the conveyed object. Accordingly, because motor current Im is none other than an event occurring at a conveyor mechanism due to a conveyed object, it corresponds to an example of a triggering event.

Note that conveyor system 1 is not limited to examples in which steps S3 and S4 are both executed, it being sufficient that at least one of the first processing at step S3 (steps S11 through S22) or the second processing at step S4 (steps S31 through S55) be executed.

Furthermore, conveyor system 1 need not be provided with second self-diagnostic unit 310. In the event that step S41 is not executed and the result of evaluation at S37 is YES, processing might proceed to step S31. Furthermore, in the event that steps S36, S37, and S41 are not executed and the result of evaluation at step S35 is YES, processing might proceed to step S38.

Furthermore, conveyor system 1 need not be provided with third self-diagnostic unit 311. In the event that step S55 is not executed and the result of evaluation at S53 is YES, processing might proceed to step S31. Furthermore, in the event that steps S52, S53, and S55 are not executed and the result of evaluation at step S51 is YES, processing might proceed to step S54.

Furthermore, there is no limitation to examples in which host controller 3 is provided with removal processor 302, abnormality history storage processor 303, motor current storage processor 304, first abnormality counter 307, second abnormality counter 308, first self-diagnostic unit 309, second self-diagnostic unit 310, third self-diagnostic unit 311, and triggering condition corrector 312, it being possible, for example, for these to be constituted by a plurality of local controllers ZC. For example, it is possible to adopt a constitution in which a plurality of local controllers ZC cooperate to function as removal processor 302, abnormality history storage processor 303, motor current storage processor 304, first abnormality counter 307, second abnormality counter 308, first self-diagnostic unit 309, second self-diagnostic unit 310, third self-diagnostic unit 311, and triggering condition corrector 312.

Figure 18:
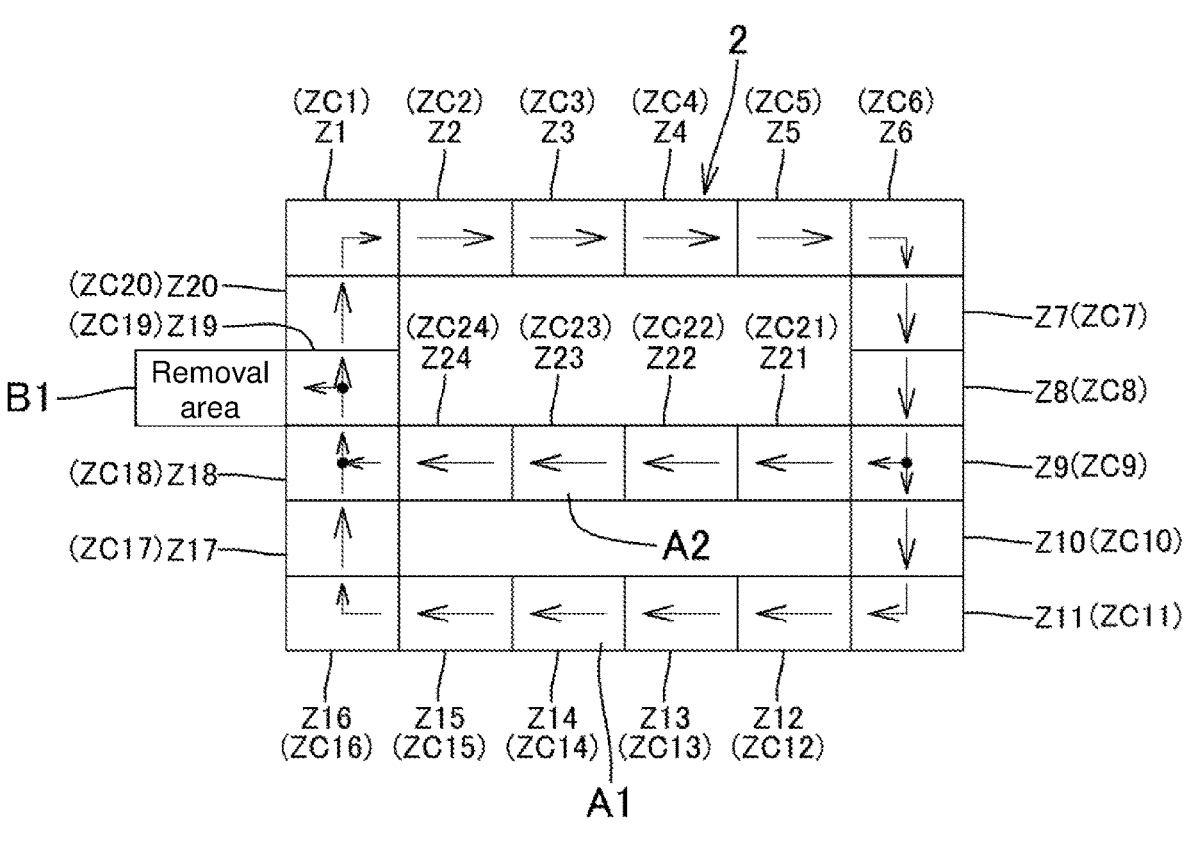
FIG. 18 is an explanatory diagram showing exemplary conveyor device having a loop-like transport path.

Furthermore, conveyor device 2 may have a loop-like transport path such as is shown, for example, in FIG. 18. In addition, transport destination(s) A1, A2 may be disposed in zone(s) Z. In the example shown in FIG. 18, zones Z14 and Z23 also serve as transport destinations A1 and A2. At such a loop-like transport path, a conveyed object at zone Z10 may, for example, be conveyed in such fashion as to go past transport destination A1, which is the transport destination for that conveyed object, and be transported to removal area B1.

For example, where the conveyed object is a pallet, there are cases in which the same pallet might make any number of laps around a loop-like transport path. In such a situation, there may be times when the pallet goes past transport destination A1 and is removed at removal area B1. This will make it possible to remove and/or replace damaged pallets.

Furthermore, the zones traversed by the conveyed object to reach the current location would be all of the zones upstream therefrom as viewed from the standpoint of the conveyed object. For example, when a conveyed object that started being conveyed from zone Z1 reaches zone Z17, zones Z1 through Z16 will simultaneously be upstream zones therefrom and downstream zones therefrom. Furthermore, as viewed, for example, from the standpoint of a conveyed object that has made one lap through zones Z1 through Z20 and has arrived at zone Z17 on its second lap, zones Z1 through Z16 and zones Z18 through Z20 will all simultaneously be upstream zones therefrom and downstream zones therefrom.

Furthermore, triggering condition corrector 312 need not be provided. At steps S35 and S51, the values employed as first electric current values I1 and second electric current values I2 may be values that have not been corrected by triggering condition corrector 312.

That is, a conveyor system in accordance with one aspect of the present invention comprises a conveyor mechanism provided with a transport path along which a conveyed object is conveyed to a prescribed transport destination; an event detector that detects a preestablished triggering event which is an event occurring at the conveyor mechanism due to the conveyed object during transport of the conveyed object; and a removal processor that, when the triggering event detected by the event detector satisfies a preestablished triggering condition, causes the conveyed object to be transported by the conveyor mechanism to a removal area which is not the transport destination.

In accordance with such constitution, when a triggering event detected by an event detector satisfies a preestablished triggering condition, a conveyor mechanism can cause a conveyed object to be removed at a removal area arranged at a location which is different from the original transport destination of the conveyed object. Accordingly, it is possible to remove a conveyed object that might otherwise cause occurrence of a prescribed event within the transport path of the conveyor.

Furthermore, it is preferred that the event detector include an abnormality detector that detects, as the triggering event, an abnormality occurring due to the conveyed object; that the conveyor system further comprise a first abnormality counter that counts a first abnormality count which is a number of times that the abnormality due to the one conveyed object is detected by the abnormality detector during transport of that conveyed object; and that the triggering condition include a first triggering condition that is satisfied when the first abnormality count exceeds a preestablished first abnormality determination count.

In accordance with such constitution, it is possible to count a first abnormality count which is the number of times that an abnormality occurs due to any one given conveyed object during transport of that conveyed object. In addition, when the first abnormality count exceeds a first abnormality determination count, that conveyed object can be conveyed to a removal area. This will make it possible to cause a conveyed object that has a tendency to produce abnormalities to be selectively removed during its transport by the conveyor system.

Furthermore, it is preferred that the abnormality include jamming whereby the conveyed object becomes incapable of being conveyed during transport of the conveyed object.

In accordance with such constitution, because it is possible to cause a conveyed object that has a tendency to produce jams to be removed from the transport path, it will be possible to reduce the likelihood that repeated jams will occur, and to improve the overall transport efficiency of the conveyor system.

Furthermore, it is preferred that the abnormality detector detect the abnormality at a plurality of locations along the transport path; that the conveyed object be one among a plurality of conveyed objects; and that the conveyor system further comprise a second abnormality counter that counts a second abnormality count which, for each of the locations, is a number of times that the abnormality is detected by the abnormality detector when the plurality of conveyed objects are sequentially conveyed; and a first self-diagnostic unit that, when the second abnormality count at any of the locations exceeds a preestablished second abnormality determination count, causes a determination to be made that there has been occurrence of trouble in the any of the locations along the transport path.

In accordance with such constitution, when there are repeated occurrences of abnormalities at a particular location in the transport path, it is possible to determine that trouble has occurred at that location.

Furthermore, it is preferred that the conveyor mechanism be divided into a plurality of zones along a transport direction of the transport path; that each of the respective zones be provided with a motor outputting a drive force for conveying the conveyed object; and that the event detector include an electric current detector that detects, as the triggering event, motor current flowing through the motor at each of the respective zones while the conveyed object is being conveyed therethrough.

There are situations in which the load on a motor varies in correspondence to the state of a conveyed object, causing motor current to vary. Accordingly, motor current is suitable as a triggering event which is an event occurring at a conveyor mechanism due to a conveyed object.

Furthermore, it is preferred that the triggering condition include a second triggering condition that is satisfied when, for a zone of interest which is any one of the plurality of zones, a motor current of interest which is the motor current in the zone of interest exceeds a preestablished first electric current value.

In accordance with such constitution, when a motor current of interest in a zone of interest increases due to a conveyed object and a first electric current value is exceeded, a second triggering condition is satisfied, as a result of which a removal processor can cause that conveyed object to be conveyed to a removal area.

Furthermore, it is preferred that the first electric current value be preestablished in correspondence to rotational velocity of the motor.

Because motor current varies in correspondence to motor rotational velocity, a first electric current value established in correspondence to motor rotational velocity will be suitable as a baseline value for the second triggering condition.

Furthermore, it is preferred that the second triggering condition be satisfied when the motor current of interest exceeds the first electric current value and the motor current of interest does not exceed a sum of a reference motor current, which is based on a motor current at a zone upstream from the zone of interest, and a preestablished first electric current value width.

Increase in motor current may occur not only due to the conveyed object but there are also situations in which it may occur due to failure or the like at the conveyor mechanism. Increase in motor current due to failure or the like at the conveyor mechanism is likely to occur only at that zone, and is more likely to occur than increase in motor current due to the conveyed object. Where the increase in motor current is not so large as to exceed a first electric current value width as compared with a reference motor current which is based on motor current(s) of zone(s) upstream therefrom, it may therefore be assumed that an increase in motor current which is due to a conveyed object has occurred. In such a situation, a second triggering condition can be satisfied, and that conveyed object can be removed by causing it to be conveyed to a removal area.

It is preferred that the triggering condition include a third triggering condition that is satisfied when the motor current of interest is less than a second electric current value which is less than the first electric current value.

In accordance with such constitution, when a motor current of interest in a zone of interest decreases due to a conveyed object and falls below a second electric current value which is less than the first electric current value, a third triggering condition is satisfied, as a result of which a removal processor can cause that conveyed object to be conveyed to a removal area.

Furthermore, it is preferred that the second electric current value be preestablished in correspondence to rotational velocity of the motor.

Because motor current varies in correspondence to motor rotational velocity, a second electric current value established in correspondence to motor rotational velocity will be suitable as a baseline value for the third triggering condition.

Furthermore, it is preferred that the third triggering condition be satisfied when the motor current of interest is less than the second electric current value and the motor current of interest is not less than a value which is a reference motor current, which is based on a motor current at a zone upstream from the zone of interest, minus a preestablished second electric current value width.

Decrease in motor current may occur not only due to the conveyed object but there are also situations in which it may occur due to the state of the conveyor mechanism or the like. Decrease in motor current due to the state of the conveyor mechanism or the like is likely to occur only at that zone, and is more likely to occur than decrease in motor current due to the conveyed object. Where the decrease in motor current is not so large as to exceed a second electric current value width as compared with a reference motor current which is based on motor current(s) of zone(s) upstream therefrom, it may therefore be assumed that a decrease in motor current which is due to a conveyed object has occurred. In such a situation, a third triggering condition can be satisfied, and that conveyed object can be removed by causing it to be conveyed to a removal area.

Furthermore, it is preferred that the conveyed object be one among a plurality of conveyed objects, the conveyed objects being assigned identifier information for respectively identifying the conveyed objects; that the conveyor system further comprise a motor current storage processor that stores motor currents pertaining to the respective zones in association with identifier information of conveyed objects being transported therethrough; and that the reference motor current be based on a motor current associated with identifier information identical to the identifier information associated with the motor current of interest at a zone upstream from the zone of interest.

Motor current varies due to conveyed objects. Furthermore, reference motor current may be used as baseline for distinguishing between fluctuations in motor current due to failure or other such state or the like of a conveyor mechanism, which is likely to occur only at that zone, versus fluctuations in motor current due to a conveyed object. Accordingly, to eliminate the influence of the conveyed object, it is preferred that the reference motor current be based on a motor current associated with identifier information identical to the identifier information of a conveyed object associated with the motor current of interest, i.e., the motor current at a time when the same conveyed object was being conveyed at a location upstream therefrom.

Furthermore, it is preferred that the conveyor system further comprise a motor current storage processor that stores, in associated fashion, the motor current and a rotational velocity of the motor during transport through the respective zones; wherein the reference motor current is based on a motor current associated with a rotational velocity substantially identical to the rotational velocity associated with the motor current of interest at a zone upstream from the zone of interest.

Motor current varies due to motor rotational velocity. Furthermore, reference motor current may be used as baseline for distinguishing between fluctuations in motor current due to failure or other such state or the like of a conveyor mechanism, which is likely to occur only at that zone, versus fluctuations in motor current due to a conveyed object. Accordingly, to eliminate the influence of motor rotational velocity, it is preferred that the reference motor current be based on a motor current associated with a rotational velocity substantially identical to the motor rotational velocity associated with the motor current of interest, i.e., the motor current at a time when the motor was rotating at the same rotational velocity.

Furthermore, it is preferred that the conveyor system further comprise a second self-diagnostic unit that, when the motor current of interest exceeds the first electric current value and the motor current of interest exceeds a sum of the reference motor current and the first electric current value width, causes a determination to be made that there has been occurrence of trouble in the zone of interest.

Where there has been an increase in motor current that is large enough to exceed a first electric current value width as compared with a reference motor current which is based on motor current(s) of zone(s) upstream therefrom, it may be assumed that the cause thereof is not a conveyed object but occurrence of trouble in the zone of interest.

Furthermore, it is preferred that each of the respective zones be provided with a belt driven by the motor; and that the conveyor system further comprise a third self-diagnostic unit that, when the motor current of interest is less than a second electric current value and the motor current of interest is less than a value which is the reference motor current minus the second electric current value width, causes a determination to be made that that the belt is loose in the zone of interest.

Where there has been a decrease in motor current that is large enough to exceed a second electric current value width as compared with a reference motor current which is based on motor current(s) of zone(s) upstream therefrom, it may be assumed that the cause thereof is not a conveyed object but the fact that the belt is loose in the zone of interest.

Furthermore, it is preferred that the conveyor system further comprise a triggering condition corrector that, during a period when the conveyed object is not being conveyed by a drive force from at least one among the plurality of motors, corrects the triggering condition in correspondence to motor current detected by the electric current detector from the at least one motor.

Motor current has temperature dependency. In accordance with such constitution, this being without regard to conveyed object, the motor current detected by the electric current detector is thus susceptible to the influence of ambient temperature. Accordingly, by causing the triggering condition to be corrected in correspondence to this motor current, it will be possible to reduce the effect of temperature on motor current, and to improve the precision with which judgments are made in conveying a conveyed object through a transport area.

With a conveyor system having such constitution, it will be possible to remove a conveyed object that might otherwise cause occurrence of a prescribed event within the transport path of the conveyor.

This application claims is based on Japanese Patent Application No. 2019-194676 filed on 25 Oct. 2019, the content of which is hereby incorporated herein. Note, moreover, that the specific embodiments and working examples in the section providing detailed description of the invention have been presented merely for the purpose of illustrating the technical content of the present invention and should not be construed narrowly or in a manner that would limit the invention to such specific examples alone, it being possible to practice various modifications that are within the scope of the claims appended below and the spirit of the present invention.

EXPLANATION OF REFERENCE NUMERALS

1 Conveyor system
2 Conveyor device
3 Host controller
5 Transport roller
5a Drive roller
5b Idler roller
6 Sideframe
7, 15, 17 Belt
8 Inventory sensor
11 Main transport conveyor
12 Subordinate transport conveyor
13 Elevator device
15 Drive roller
16 Roller
18 Direct-acting cam
19 Elevator motor
20 Rack-and-pinion mechanism
21 Elevator controller
30 Arithmetic unit
31 Display
32 Keyboard 33 Mouse
34 Communication interface unit
35 Layout information storage unit
36 Abnormality history storage unit
37 Motor current storage unit
50 Controller
51 Drive controller
52 Velocity controller
53 Rotational velocity detector
54 Electric current information transmitter
56 Abnormality detector (event detector)
57 Local communication unit
58 Settings storage unit
60 Motor subassembly
61 Motor
62 Motor drive circuit
63 Electric current detector (event detector)
64 Hall effect element
65 Drive voltage detector
71, 72, 73, 74, 711, 712, 721, 722
    Electric current information record
301 Transport controller
302 Removal processor
303 Abnormality history storage processor
304 Motor current storage processor
307 First abnormality counter
308 Second abnormality counter
309 First self-diagnostic unit
310 Second self-diagnostic unit
311 Third self-diagnostic unit
312 Triggering condition corrector
561 Jam error detector
562 Low voltage error detector
563 Motor lock error detector
A, A1, A2 Transport destination
B, B1, B2, B3, B4 Removal area
C1$j$ First abnormality determination count
C2$j$ Second abnormality determination count
CT1 First abnormality count
CT2 Second abnormality count
I1 First electric current value
I1$w$ First electric current value width
I2 Second electric current value
I2$w$ Second electric current value width
ID Identifier information
IDt Identifier information of interest
Im Motor current
Imt Motor current of interest
Ir Reference motor current
Is Nonconveying electric current value
M, M1-M28 Conveyor module
MC, MCs, MCt Conveyor mechanism
Ms Forward conveying module
Mt Direction changing module
tc Dwell time
tj Jam determination time
trref Rotation determination time
Vd Drive power supply voltage
Vdref Drive determination voltage
Vr Rotational velocity
Vrt Rotational velocity of interest
Vs Default rotational velocity
Z, Z1-Z28 Zone
ZC, ZC1-ZC28 Local controller

What is claimed is:

1. A conveyor system comprising:
a conveyor mechanism provided with a transport path along which a first conveyed object is conveyed to a prescribed transport destination;
an event detector that detects a preestablished triggering event which is an event occurring at the conveyor mechanism due to the first conveyed object during transport of the first conveyed object, the detected event occurring at the conveyor mechanism being an erroneous event or an abnormal event exhibited by the conveyor mechanism; and
a removal processor that, when the triggering event detected by the event detector satisfies a preestablished triggering condition, causes the first conveyed object, which is conveyed to a prescribed transport destination and causes the triggering event to be exhibited by the conveyor mechanism, and as a result to be transported by the conveyor mechanism to a removal area which is not the transport destination,
wherein: the conveyor mechanism is divided into a plurality of zones along a transport direction of the transport path; each of the respective zones is provided with a motor outputting a drive force for conveying the first conveyed object; and the event detector includes an electric current detector that detects, as the triggering event, motor current flowing through the motor at each of the respective zones while the first conveyed object is being conveyed therethrough,
wherein the triggering condition includes a second triggering condition that is satisfied when, for a zone of interest which is any one of the plurality of zones, a motor current of interest which is the motor current in the zone of interest exceeds a preestablished first electric current value, and
wherein the second triggering condition is that the motor current of interest exceeds the first electric current value and the motor current of interest does not exceed a sum of a reference motor current, which is based on a motor current at a zone upstream from the zone of interest and a preestablished first electric current value width.

2. The conveyor system according to claim 1 wherein:
the event detector includes an abnormality detector that detects, as the triggering event, an abnormality occurring due to the first conveyed object;
the conveyor system further comprises a first abnormality counter that counts a first abnormality count which is a number of times that the abnormality due to the first conveyed object is detected by the abnormality detector during transport of the first conveyed object; and
the triggering condition includes a first triggering condition that is satisfied when the first abnormality count exceeds a preestablished first abnormality determination count.

3. The conveyor system according to claim 2 wherein jamming whereby the first conveyed object becomes incapable of being conveyed during transport of the first conveyed object is capable of being detected as the abnormality.

4. The conveyor system according to claim 2 wherein:
the abnormality detector detects the abnormality at a plurality of locations along the transport path;
the first conveyed object is one among a plurality of conveyed objects; and the conveyor system further comprises
a second abnormality counter that counts a second abnormality count which, for each of the locations, is a number of times that the abnormality is detected by the abnormality detector when the plurality of conveyed objects are sequentially conveyed; and a first self-diagnostic unit that, when the second abnormality count at any of the locations exceeds a preestablished second abnormality determination count, causes a determination to be made that there has been occurrence of trouble in the any of the locations along the transport path.

5. The conveyor system according to claim 1 wherein the first electric current value is preestablished in correspondence to rotational velocity of the motor.

6. The conveyor system according to claim 1 wherein the triggering condition includes a third triggering condition that is satisfied when the motor current of interest is less than a second electric current value which is less than the first electric current value.

7. The conveyor system according to claim 6 wherein the second electric current value is preestablished in correspondence to rotational velocity of the motor.

8. The conveyor system according to claim 6 wherein the third triggering condition is that the motor current of interest is less than the second electric current value and the motor current of interest is not less than a value which is a reference motor current, which is based on a motor current at a zone upstream from the zone of interest, minus a preestablished second electric current value width.

9. The conveyor system according to claim 8 wherein each of the respective zones is provided with a belt driven by the motor; and wherein the conveyor system further comprises a third self-diagnostic unit that, when the motor current of interest is less than second electric current value and the motor current of interest is less than a value which is the reference motor current minus the second electric current value width, causes a determination to be made that that the belt is loose in the zone of interest.

10. The conveyor system according to claim 8 wherein:

the first conveyed object is one among a plurality of conveyed objects, the conveyed objects being assigned identifier information for respectively identifying the conveyed objects;

the conveyor system further comprises a motor current storage processor that stores motor currents pertaining to the respective zones in association with identifier information of the conveyed objects being transported therethrough; and the reference motor current is based on a motor current associated with identifier information identical to the identifier information associated with the motor current of interest at a zone upstream from the zone of interest.

11. The conveyor system according to claim 10 further comprising a motor current storage processor that stores, in associated fashion, the motor current and a rotational velocity of the motor during transport through the respective zones;

wherein the reference motor current is based on a motor current associated with a rotational velocity substantially identical to the rotational velocity associated with the motor current of interest at a zone upstream from the zone of interest.

12. The conveyor system according to claim 8 further comprising a motor current storage processor that stores, in associated fashion, the motor current and a rotational velocity of the motor during transport through the respective zones;

wherein the reference motor current is based on a motor current associated with a rotational velocity substantially identical to the rotational velocity associated with the motor current of interest at a zone upstream from the zone of interest.

13. The conveyor system according to claim 1 wherein:

the first conveyed object is one among a plurality of conveyed objects, the conveyed objects being assigned identifier information for respectively identifying the conveyed objects;

the conveyor system further comprises a motor current storage processor that stores motor currents pertaining to the respective zones in association with identifier information of the conveyed objects being transported therethrough; and the motor current at the zone upstream from the zone of interest on which the reference motor current is based is associated with the identifier information that is associated with the motor current of interest.

14. The conveyor system according to claim 13 further comprising a motor current storage processor that stores, in associated fashion, the motor current and a rotational velocity of the motor during transport through the respective zones;

wherein the reference motor current is based on a motor current associated with a rotational velocity substantially identical to the rotational velocity associated with the motor current of interest at a zone upstream from the zone of interest.

15. The conveyor system according to claim 1 further comprising a motor current storage processor that stores, in associated fashion, the motor current and a rotational velocity of the motor during transport through the respective zones;

wherein the reference motor current is based on a motor current associated with a rotational velocity substantially identical to the rotational velocity associated with the motor current of interest at a zone upstream from the zone of interest.

16. The conveyor system according to claim 1 further comprising a second self-diagnostic unit that, when the motor current of interest exceeds the first electric current value and the motor current of interest exceeds a sum of the reference motor current and the first electric current value width, causes a determination to be made that there has been occurrence of trouble in the zone of interest.

17. The conveyor system according to claim 1 further comprising a triggering condition corrector that, during a period when the first conveyed object is not being conveyed by a drive force from at least one among the plurality of motors, corrects the triggering condition in correspondence to motor current detected by the electric current detector from the at least one motor.

18. A conveyor system comprising:

a conveyor mechanism provided with a transport path along which a first conveyed object is conveyed to a prescribed transport destination;

an event detector that detects a preestablished triggering event which is an event occurring at the conveyor mechanism due to the first conveyed object during transport of the first conveyed object, the detected event occurring at the conveyor mechanism being an erroneous event or an abnormal event exhibited by the conveyor mechanism; and a removal processor that, when the triggering event detected by the event detector satisfies a preestablished triggering condition, causes the first conveyed object, which is conveyed to a prescribed transport destination and causes the triggering event to be exhibited by the conveyor mechanism, and as a result to be transported by the conveyor mechanism to a removal area which is not the transport destination, wherein: the conveyor mechanism is divided into a plurality of zones along a transport direction of the transport path; each of the respective zones is provided with a motor outputting a drive force for conveying the first conveyed object; and the event detector includes an electric current detector that detects, as the triggering event, motor current flowing through the motor at each of the respective zones while the first conveyed object is being conveyed therethrough, wherein the triggering condition includes a second triggering condition that is satisfied when, for a zone of interest which is any one of the plurality of zones, a motor current of interest which is the motor current in the zone of interest exceeds a preestablished first electric current value, wherein the triggering condition includes a third triggering condition that is satisfied when the motor current of interest is less than a second electric current value which is less than the first electric current value, and wherein the third triggering condition is that the motor current of interest is less than the second electric current value and the motor current of interest is not less than a value which is a reference motor current, which is based on a motor current at a zone upstream from the zone of interest, minus a preestablished second electric current value width.

\* \* \* \* \*